(12) United States Patent
Luckey, Jr. et al.

(10) Patent No.: US 10,086,422 B2
(45) Date of Patent: Oct. 2, 2018

(54) VALUE STREAM PROCESS FOR FORMING VEHICLE RAILS FROM EXTRUDED ALUMINUM TUBES

(71) Applicant: FORD GLOBAL TECHNOLOGIES, LLC, Dearborn, MI (US)

(72) Inventors: S. George Luckey, Jr., Dearborn, MI (US); David John Hill, Ann Arbor, MI (US); Peter A. Friedman, Ann Arbor, MI (US); Christopher John May, Novi, MI (US); Stephen Kernosky, Livonia, MI (US); Andrey M. Ilinich, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 489 days.

(21) Appl. No.: 14/428,051

(22) PCT Filed: Jun. 16, 2014

(86) PCT No.: PCT/US2014/042449
§ 371 (c)(1),
(2) Date: Mar. 13, 2015

(87) PCT Pub. No.: WO2015/167588
PCT Pub. Date: Nov. 5, 2015

(65) Prior Publication Data
US 2016/0001345 A1  Jan. 7, 2016

Related U.S. Application Data

(63) Continuation of application No. 14/266,065, filed on Apr. 30, 2014, and a continuation-in-part of
(Continued)

(51) Int. Cl.
*C22F 1/04* (2006.01)
*B21D 26/033* (2011.01)
(Continued)

(52) U.S. Cl.
CPC ............. *B21D 26/033* (2013.01); *B21D 7/16* (2013.01); *B21D 7/162* (2013.01); *B21D 35/002* (2013.01);
(Continued)

(58) Field of Classification Search
CPC ........ B21D 26/033; B21D 7/162; B21D 7/16; B21D 35/002; C21D 7/12; C21D 1/26;
(Continued)

(56) References Cited

U.S. PATENT DOCUMENTS 2,962,077 A  11/1960  Condiff
3,456,482 A   7/1969  Maier et al.
(Continued)

FOREIGN PATENT DOCUMENTS

AT  507490 A1    5/2010
DE  4322711 A1 *  1/1995 ............... B21D 7/06
(Continued)

OTHER PUBLICATIONS

A. Gillard, et al.; "Incremental Forming of 5xxx and 6xxx Aluminum Alloys for Improved Formability"; Ford Research and Advanced Engineering Technical Reports, SRR-2005-0096, Project No. AJ41G, Jun. 6, 2005; 48 pages.
(Continued)

*Primary Examiner* — Kiley S Stoner
(74) *Attorney, Agent, or Firm* — Jason Rogers; King & Schickli, PLLC

(57) ABSTRACT

A value stream process or method for forming vehicle rails from extruded aluminum tubes includes the steps of extruding an aluminum tube and hydroforming the extruded aluminum tube into a vehicle rail. More specifically, the method includes extruding the aluminum tube, bending the aluminum tube, preforming the aluminum tube, hydroforming the aluminum tube into a vehicle rail, trimming the vehicle rail
(Continued)

to length and then artificially aging the rail followed by batch chemical pretreatment. In an alternative embodiment the artificial aging and batch chemical pretreatment processes are performed in reverse order. In either of the embodiments, localized induction annealing to recover formability may be performed between bending and preforming, between preforming and hydroforming or both.

17 Claims, 28 Drawing Sheets

Related U.S. Application Data application No. 14/266,903, filed on May 1, 2014, now Pat. No. 9,709,333, and a continuation-in-part of application No. 14/279,808, filed on May 16, 2014, and a continuation-in-part of application No. 14/300,378, filed on Jun. 10, 2014, now Pat. No. 9,545,657.

(51) Int. Cl.
| | |
|---|---|
| B21D 35/00 | (2006.01) |
| C22F 1/05 | (2006.01) |
| C22F 1/047 | (2006.01) |
| C22F 1/043 | (2006.01) |
| C22C 21/02 | (2006.01) |
| C22C 21/08 | (2006.01) |
| C22C 21/00 | (2006.01) |
| C21D 1/42 | (2006.01) |
| B21D 7/16 | (2006.01) |
| B62D 29/00 | (2006.01) |
| B62D 65/00 | (2006.01) |
| C22C 21/14 | (2006.01) |
| C22C 21/16 | (2006.01) |
| C22C 21/18 | (2006.01) |
| C22F 1/057 | (2006.01) |
| C21D 7/02 | (2006.01) |
| C21D 7/12 | (2006.01) |
| C21D 1/26 | (2006.01) |

(52) U.S. Cl.
CPC ........... *B62D 29/008* (2013.01); *B62D 65/00* (2013.01); *C21D 1/26* (2013.01); *C21D 1/42* (2013.01); *C21D 7/02* (2013.01); *C21D 7/12* (2013.01); *C22C 21/00* (2013.01); *C22C 21/02* (2013.01); *C22C 21/08* (2013.01); *C22C 21/14* (2013.01); *C22C 21/16* (2013.01); *C22C 21/18* (2013.01); *C22F 1/04* (2013.01); *C22F 1/043* (2013.01); *C22F 1/047* (2013.01); *C22F 1/05* (2013.01); *C22F 1/057* (2013.01); *Y02P 10/253* (2015.11)

(58) Field of Classification Search
CPC .. C21D 7/02; C21D 1/42; C22C 21/16; C22C 21/14; C22C 21/18; C22C 21/02; C22C 21/08; C22C 21/00; B62D 65/00; B62D 29/008; C22F 1/04; C22F 1/057; C22F 1/047; C22F 1/043; C22F 1/05; Y02P 10/253
See application file for complete search history.

(56) References Cited

U.S. PATENT DOCUMENTS

| | | | |
|---|---|---|---|
| 4,713,063 A * | 12/1987 | Krumme | A61M 5/16813 251/6 |
| 4,766,664 A | 8/1988 | Benedyk | B21D 39/063 148/520 |
| 5,070,717 A | 12/1991 | Boyd et al. | |
| RE33,990 E | 7/1992 | Cudini | |
| 5,303,570 A | 4/1994 | Kaiser | |
| 5,339,667 A | 8/1994 | Shah et al. | |
| 5,557,961 A * | 9/1996 | Ni | B21D 22/025 29/421.1 |
| 5,728,241 A | 3/1998 | Gupta et al. | |
| 5,890,387 A | 4/1999 | Roper et al. | |
| 5,931,520 A * | 8/1999 | Seksaria | B60R 21/045 280/752 |
| 6,016,603 A | 1/2000 | Marando et al. | |
| 6,032,501 A | 3/2000 | Bihrer | |
| 6,065,502 A | 5/2000 | Horton | |
| 6,122,948 A | 9/2000 | Moses | |
| 6,134,886 A * | 10/2000 | Bussmann | F01N 13/10 60/323 |
| 6,176,544 B1 * | 1/2001 | Seksaria | B60R 21/045 280/752 |
| 6,237,382 B1 | 5/2001 | Kojima et al. | |
| 6,257,035 B1 | 7/2001 | Marks et al. | |
| 6,415,638 B1 | 7/2002 | Sakurai et al. | |
| 6,495,792 B1 * | 12/2002 | Gysi | B23K 26/262 219/121.63 |
| 6,513,243 B1 | 2/2003 | Bignucolo et al. | |
| 6,547,267 B1 * | 4/2003 | Heep | B60G 7/001 280/124.128 |
| 6,810,705 B1 | 11/2004 | Leppin et al. | |
| 6,828,523 B1 * | 12/2004 | Gysi | B23K 15/006 219/121.13 |
| 7,204,114 B2 | 4/2007 | Ni et al. | |
| 7,464,572 B2 | 12/2008 | Miyanaga et al. | |
| 7,491,278 B2 | 2/2009 | Kropfl | |
| 8,163,113 B2 | 4/2012 | Mishra et al. | |
| 8,171,769 B2 | 5/2012 | Barthelemy et al. | |
| 8,297,096 B2 | 10/2012 | Mizumura et al. | |
| 8,826,712 B1 * | 9/2014 | Luckey, Jr. | B21D 26/033 29/421.1 |
| 9,079,617 B1 * | 7/2015 | Lueschen | B62D 27/023 |
| 9,533,343 B2 * | 1/2017 | May | B62D 29/008 |
| 9,669,877 B2 * | 6/2017 | Maeda | B62D 25/04 |
| 2001/0029668 A1 * | 10/2001 | Schreiber | B23P 15/04 29/889.7 |
| 2002/0005058 A1 | 1/2002 | Humphries et al. | |
| 2002/0046505 A1 | 4/2002 | Seksaria et al. | |
| 2002/0066254 A1 * | 6/2002 | Ebbinghaus | B21C 37/04 52/36.5 |
| 2002/0125739 A1 | 9/2002 | Czaplicki et al. | |
| 2003/0164210 A1 * | 9/2003 | Forster | B21D 53/16 148/589 |
| 2003/0192160 A1 * | 10/2003 | Luo | B21B 3/003 29/421.1 |
| 2004/0048013 A1 * | 3/2004 | Gehrig | B21D 11/10 428/34.1 |
| 2004/0132628 A1 * | 7/2004 | Geke | B21C 9/00 508/451 |
| 2004/0163743 A1 * | 8/2004 | Dickson | C22F 1/04 148/570 |
| 2004/0255629 A1 * | 12/2004 | Bjuhr | B21D 26/047 72/58 |
| 2005/0015952 A1 * | 1/2005 | Furchheim | B21D 26/033 29/6.01 |
| 2005/0257774 A1 * | 11/2005 | Usui | F02M 55/025 123/456 |
| 2006/0065031 A1 | 3/2006 | Marando | |
| 2006/0150389 A1 * | 7/2006 | Schwarz | B21D 26/035 29/521 |
| 2006/0201227 A1 * | 9/2006 | Lepre | B21C 1/24 72/370.14 |
| 2006/0230801 A1 * | 10/2006 | Dudziak | B21D 26/037 72/58 |
| 2007/0157692 A1 * | 7/2007 | Aue | B21D 26/02 72/55 |
| 2008/0047297 A1 * | 2/2008 | Jung | F25B 39/04 62/513 |
| 2008/0194347 A1 * | 8/2008 | Vogel | F16D 1/0858 464/183 |

(56) References Cited

U.S. PATENT DOCUMENTS

| | | | |
|---|---|---|---|
| 2008/0250833 A1* | 10/2008 | Drewes | B21D 26/033 72/61 |
| 2009/0029887 A1* | 1/2009 | Schwab | B21D 22/201 508/283 |
| 2009/0038428 A1 | 2/2009 | Abe et al. | |
| 2010/0116011 A1* | 5/2010 | Mizumura | B21D 26/033 72/61 |
| 2010/0206035 A1 | 8/2010 | Bestard et al. | |
| 2011/0061437 A1* | 3/2011 | Kapp | B21D 26/031 72/347 |
| 2011/0062155 A1 | 3/2011 | Walther et al. | |
| 2011/0074153 A1* | 3/2011 | Feldmeier | H01R 13/04 290/44 |
| 2011/0104350 A1* | 5/2011 | Clusserath | A23L 2/46 426/519 |
| 2011/0241385 A1 | 6/2011 | Baccouche et al. | |
| 2012/0161474 A1 | 6/2012 | Gerke et al. | |
| 2014/0110091 A1* | 4/2014 | Fries | B23P 15/26 165/132 |
| 2014/0128168 A1* | 5/2014 | Laskey | F16C 3/02 464/183 |
| 2014/0223983 A1* | 8/2014 | Christianson | B21D 26/033 72/58 |
| 2014/0237714 A1* | 8/2014 | Rusch | A47K 3/40 4/598 |
| 2014/0260479 A1* | 9/2014 | Luckey, Jr. | B21D 26/033 72/61 |
| 2014/0323233 A1* | 10/2014 | Braun | F16D 3/40 464/136 |
| 2015/0315666 A1 | 11/2015 | Harrison et al. | |
| 2016/0075381 A1* | 3/2016 | Keller | B62D 21/11 280/795 |
| 2016/0116316 A1* | 4/2016 | Kissling | G01F 1/662 73/861.25 |
| 2016/0332096 A1* | 11/2016 | Rolle | B01D 35/30 |
| 2017/0107601 A1* | 4/2017 | Anderseck | C22F 1/06 |
| 2017/0261356 A1* | 9/2017 | Tschambser | G01F 1/58 |
| 2017/0299007 A1* | 10/2017 | Scharf | F16F 1/38 |
| 2017/0312804 A1* | 11/2017 | Lindner | B21D 53/845 |
| 2017/0314977 A1* | 11/2017 | Wiest | G01F 1/662 |

FOREIGN PATENT DOCUMENTS

| | | |
|---|---|---|
| DE | 10312028 A1 | 10/2004 |
| EP | 2351623 A1 | 8/2011 |
| JP | 2001009528 A | 1/2001 |
| JP | 2003154414 A * | 5/2003 |
| JP | 2009045665 A * | 3/2009 |
| JP | 2010159005 A * | 7/2010 |
| JP | 2010196089 A * | 9/2010 |
| KR | 20050011285 A * | 1/2005 |
| KR | 1020050011285 A | 1/2005 |
| KR | 2006013889 A1 * | 2/2006 |
| KR | 20080000689 A * | 1/2008 |
| KR | 1020100002724 | 9/2011 |
| SU | 1523226 A1 | 11/1989 |
| WO | 0128708 A1 | 4/2001 |
| WO | 2009097886 A1 | 8/2009 |
| WO | 2011099592 A1 | 8/2011 |
| WO | 2013124198 A1 | 8/2013 |

OTHER PUBLICATIONS

H.K. Yi, et al.; "Application of a combined heating system for the warm hydroforming of lightweight alloy tubes"; Elsevier, Journal of Materials Processing Technology, vol. 203, (2008), pp. 532-536.

Patent Cooperation Treaty, PCT/US2014/042449, PCT International Search Report and Written Opinion, dated Nov. 4, 2014, 7 pages.

English Machine Translation of DE10312028A1.
English Machine Translation of AT507490A1.
English Machine Translation of SU1523226A1.
English Machine Translation of JP2001009528A.
English Machine Translation of WO2011099592A1.

Z.L. Zhang et al., A Method for retrieving temperature and microstructure dependent apparent yield strength for aluminum alloys, pp. 35-45, Computational Materials Science 34 (2005).

A. Loukus, G. Subhash, M. Imaninejad, Mechanical properties and microstructural characterization of extrusion welds in AA6082-T4, 2004, pp. 6561-6569, Journal of Materials Science 39 (2004).

Aalco Metals Ltd., Aluminum Alloy 6082—T6-T651 Plate, 2016, No of pp. 2.

S. Yuan, et al.; "New Developments of Hydrofoming in China"; Materials transactions, vol. 53, No. 5 (2012) pp. 787-795.

The Aluminum Automotive Manual, Version 2002; European Aluminum Association; pp. 1-96.

English Machine Translation of WO2009097886A1.
English Machine Translation of KR1020050011285A.

Notification of First Office Action dated Feb. 24, 2018 for CN Patent Application No. 2014800786309 filed Oct. 28, 2016.

* cited by examiner

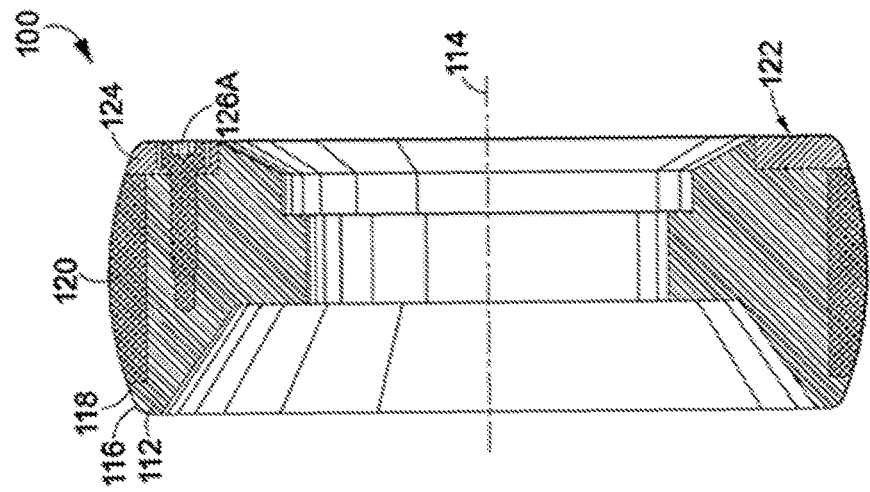
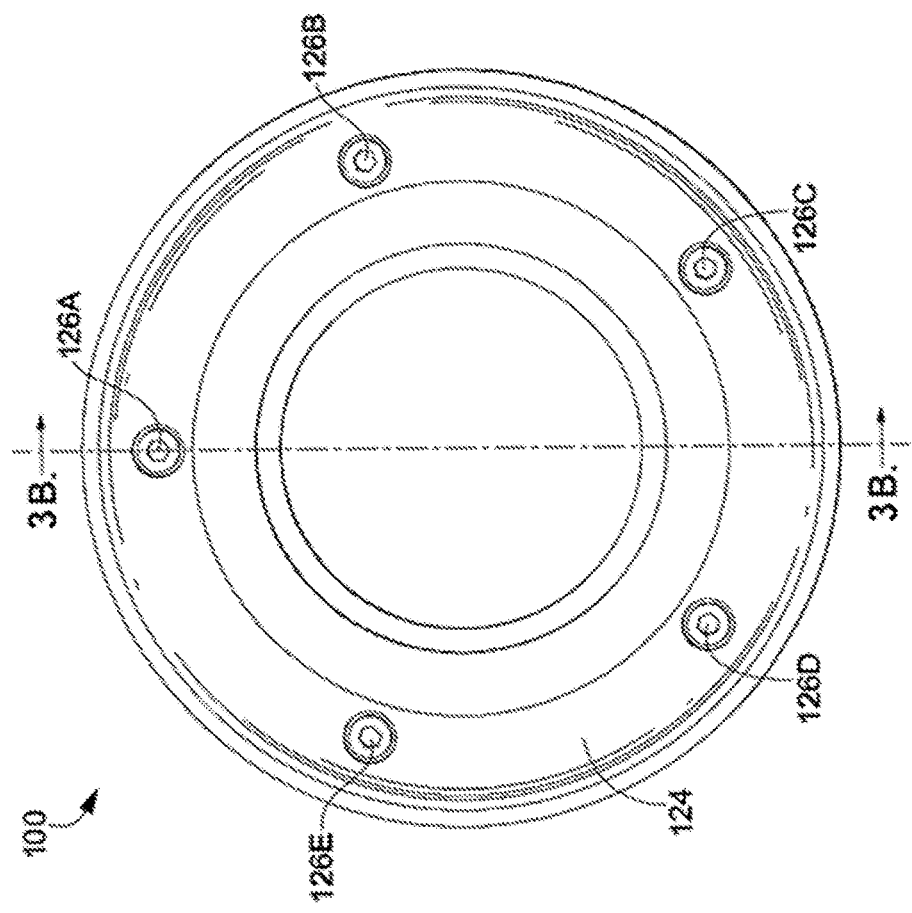

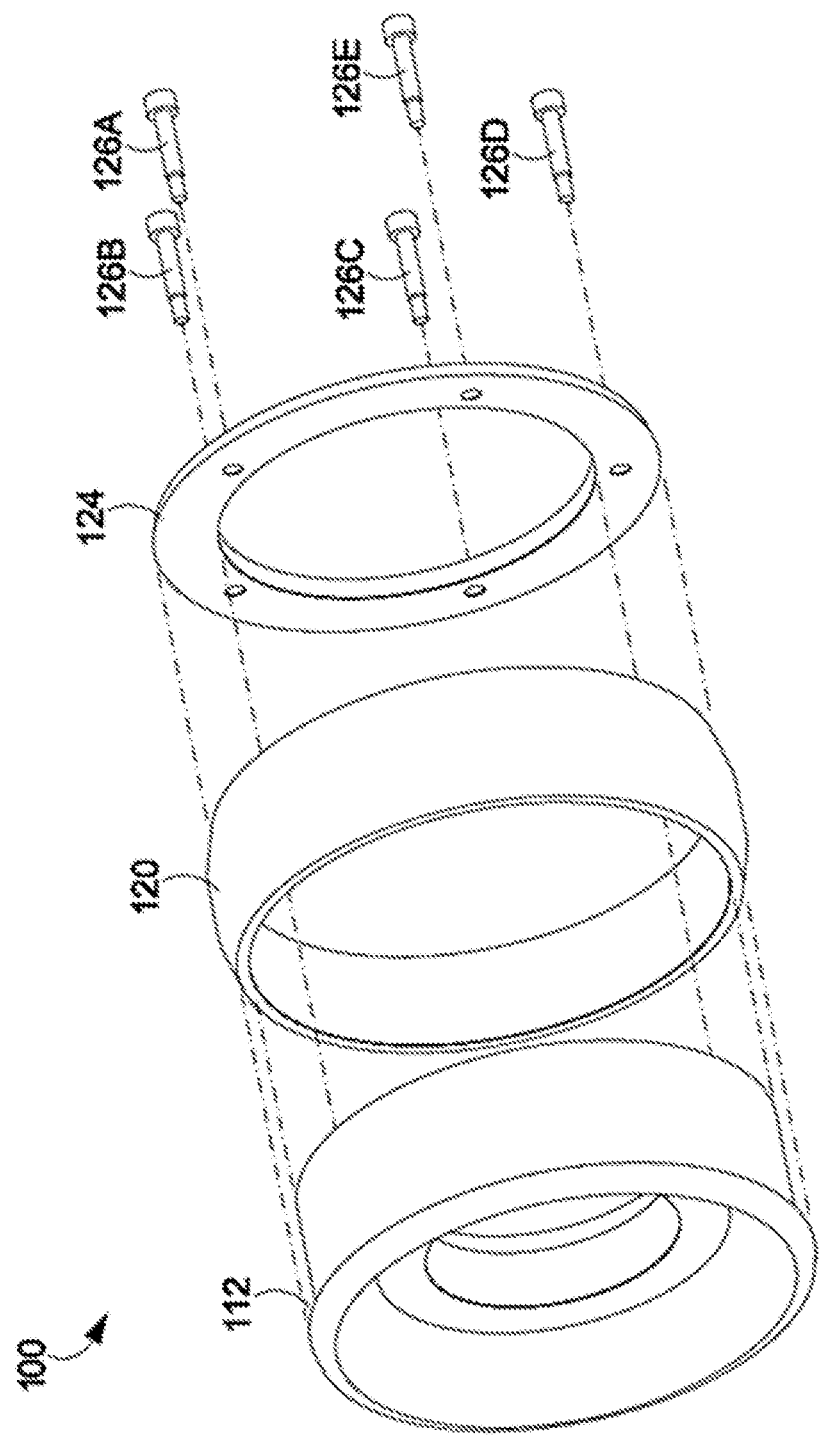

VALUE STREAM PROCESS FOR FORMING VEHICLE RAILS FROM EXTRUDED ALUMINUM TUBES

TECHNICAL FIELD

This document relates generally to vehicle manufacturing processes and, more particularly, to a process for hydroforming vehicle rails from extruded aluminum tubes.

BACKGROUND

Vehicle manufacturers are implementing lighter, stronger materials, such as aluminum alloys, to meet emission reduction goals, meet fuel economy goals, reduce manufacturing costs, and reduce vehicle weight. In addition, increasingly demanding safety standards must be met while reducing vehicle weight. One approach to meet these competing interests and objectives is to hydroform high strength aluminum alloy tubular blanks into strong, lightweight hydroformed parts such as roof rails and front rails of vehicles.

This document relates to a new and improved value stream process for manufacturing such parts in a more efficient and effective manner.

SUMMARY

In accordance with the purposes and benefits described herein, a method is provided of forming a vehicle rail from aluminum. That method may be broadly defined by the steps of extruding an aluminum tube and hydroforming the extruded aluminum tube into the vehicle rail. The method may further include longitudinally bending the extruded aluminum tube before hydroforming. Further the method may include preforming the extruded aluminum tube after bending. That bending may be completed in a rotary draw bending tool and the preforming may be completed in a forming die. In another possible embodiment the bending may be completed in a push/pull bending tool and the preforming completed in a forming die.

In accordance with an additional aspect, the method includes induction annealing the extruded aluminum tube prior to hydroforming in order to restore formability. In one possible embodiment, that induction annealing is performed following bending and before preforming the extruded aluminum tube. In another possible embodiment that induction annealing is performed following preforming and before hydroforming the extruded aluminum tube. In yet another possible embodiment the induction annealing is completed both after bending and after preforming the extruded aluminum tube.

More specifically describing the method, the hydroforming of the extruded aluminum tube into a vehicle rail includes positioning the bent and preformed extruded aluminum tube into a hydroforming die, partially closing the hydro-forming die and subjecting the bent preformed extruded aluminum tube in the hydroforming die to a liquid under a first level of pressure. This is followed by engaging an inner radius of a bend in the bent and preformed extruded aluminum tube with the hydroforming die before completely closing the hydroforming die. This serves to reduce the amount of outer fiber strain on the inner radius of the bend. Further it allows the forming of a cross-section of non-constant radius along the inner radius of the bend where that cross-section includes a first transition segment, a second transition segment and an intermediate segment between the first and second transition segments. The first and second transition segments are provided with a tighter radius of curvature than the intermediate segment.

This is followed by the step of completely closing the hydroforming die and increasing the level of liquid pressure to a second level to form and hydro-pierce a part or vehicle rail from the bent and preformed extruded aluminum tube. In accordance with an additional aspect the method includes maintaining a gap between the hydroforming die and the first and second transition segments during hydroforming.

After hydroforming, the vehicle rail is trimmed to a desired length. This is followed by the loading of a plurality of hydroformed parts/rails onto a rack and heat treating a plurality of parts together to artificially age the parts and provide desired strength characteristics. Subsequently the plurality of parts are subjected to chemical pretreating on the rack to provide a chemical pretreatment to the parts after heat treating.

In an alternative embodiment the parts are initially loaded onto a rack and chemically pretreated together before being subjected to heat treating. In either of these embodiments, the parts are maintained on the same rack for the heat treating and chemical pretreatment processes.

The above aspects of this disclosure and other aspects will be described in greater detail below with reference to the attached drawing figures.

BRIEF DESCRIPTION OF THE DRAWINGS

The accompanying drawing figures incorporated herein and forming a part of the specification, illustrate several aspects of the method and together with the description serve to explain certain principles thereof. In the drawings:

FIG. 3a is a plan view of an end of an exemplary mandrel-ball assembly.

FIG. 3b is a cross-sectional view of the mandrel-ball assembly of FIG. 3a taken in a direction of arrows 3B-3B.

FIG. 4 is an exploded view of an exemplary mandrel-ball assembly.

FIG. 5b is an exploded view of the mandrel-shank assembly shown in FIG. 5a.

DETAILED DESCRIPTION

Figure 1A:
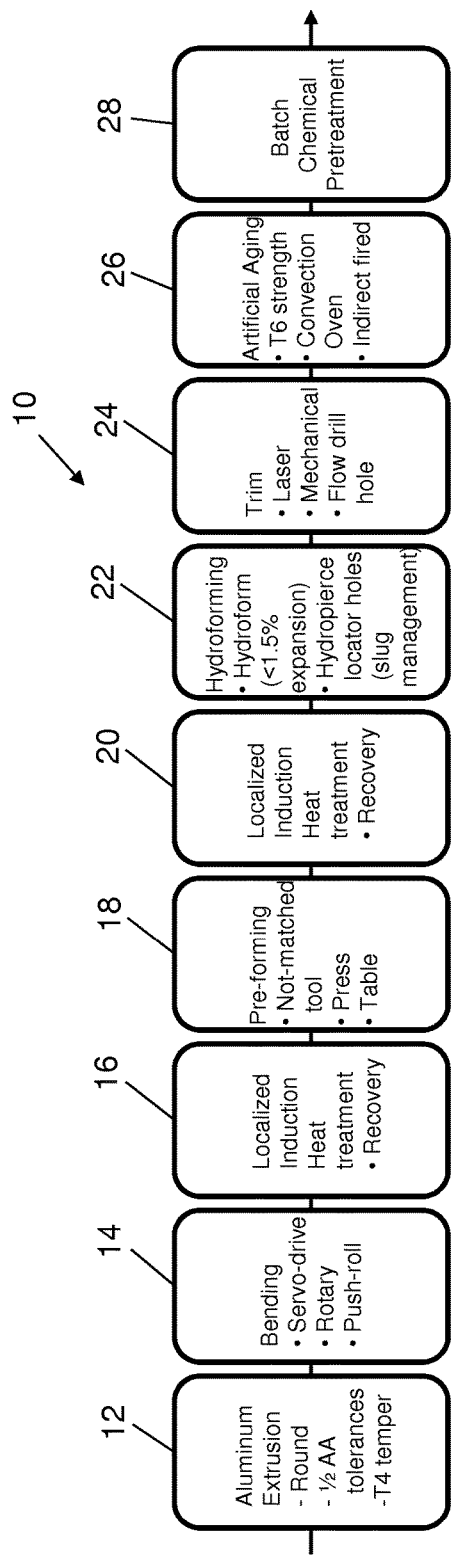
FIG. 1a is a flow chart illustrating one possible embodiment of the current value stream method of forming a vehicle rail from aluminum.

Reference is now made to FIG. 1a illustrating a first embodiment of the value stream method 10 for forming a vehicle rail from aluminum. That method includes the initial step of extruding a round cross-section aluminum tube. Typically the extruded aluminum tube is made from AA6xxx aluminum alloy material. Next is the bending of the extruded aluminum tube (see block 14). The bending may be completed by any appropriate means including in a rotary draw bending tool, a push-roll bending tool or by means of a servo-drive bending tool such as described in greater detail below.

As illustrated in FIG. 1a, the bending step is followed by localized induction annealing (see step 16). This is done in order to recover some formability for future forming operations. The localized induction annealing 16 is then followed by a step of preforming the extruded aluminum tube (see box 18). This is completed in a forming die in accordance with methods well known in the art.

As further illustrated in FIG. 1a the preforming step is followed by an additional localized induction annealing (see box 20). Here it should be mentioned that localized induction annealing to recover formability may be performed following both bending and preforming as illustrated in boxes 16 and 20 or only after bending as illustrated in box 16 or only after preforming as illustrated in box 20.

Next is the hydroforming of the extruded, bent and preformed aluminum tube (see box 22). After hydroforming the extruded aluminum tube to form the part or rail, the part is trimmed (see box 24) to desired length. In the embodiment illustrated in FIG. 1b, this is followed by artificial aging (see box 26) and then batch chemical treatment (see box 28). As illustrated in the alternative value stream method of FIG. 1b, batch chemical pretreatment 28 is completed before artificial aging 26. Thus, these final two steps may be performed in either order.

Figure 1B:
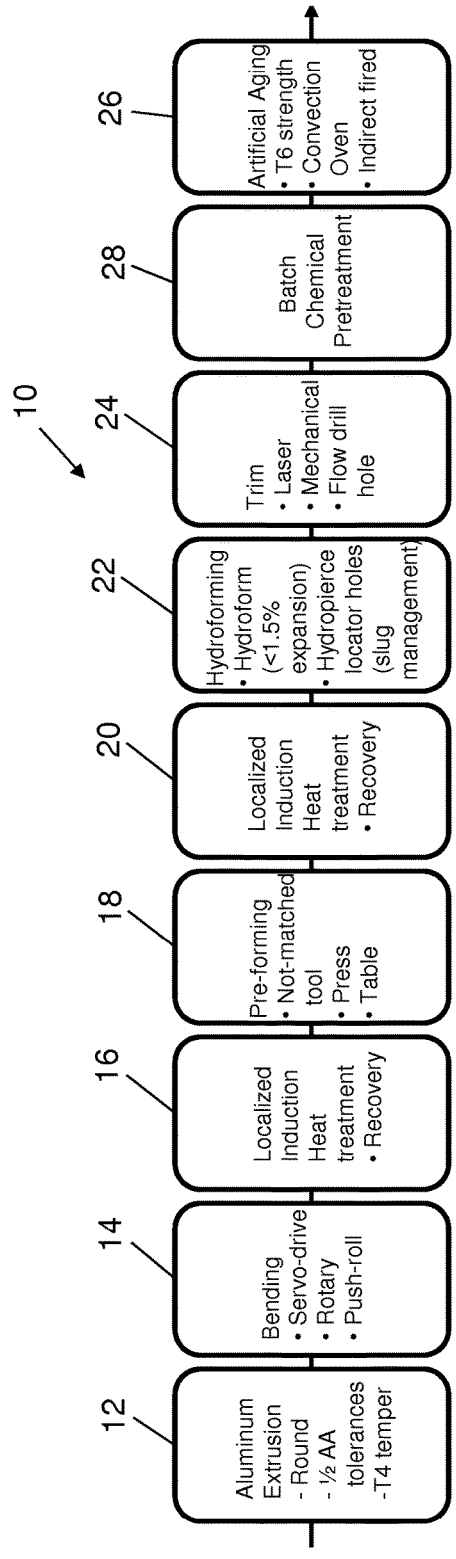
FIG. 1b is a flow chart illustrating a second possible embodiment of a value stream method of forming a vehicle rail from aluminum.

In either of the value stream method embodiments illustrated in FIGS. 1a and 1b, the artificial aging 26 is completed in order to provide the final part or vehicle rail with desired yield strength. The chemical pretreatment is completed in order to prepare the part to receives and hold adhesives, paints or other chemicals necessary for the downstream vehicle assembly process.

Reference is now made to the following subsections of this document which provide more detailed descriptions and explanations respecting the extrusion 12, bending 14, induction annealing 16 and/or 20, hydroforming 22, artificial aging 26 and batch chemical pretreatment steps 28 of the overall method 10. As should be appreciated, the pre-bending 14, induction annealing 16 and/or 20, pre-forming 18, hydroforming 22 and trimming steps 24 involve the individual processing of extruded aluminum tubes while the artificial aging 26 and chemical pretreatment 28 steps comprise a plurality of parts or vehicle rails processed together in common racks.

Extruding Process

Figure 2:
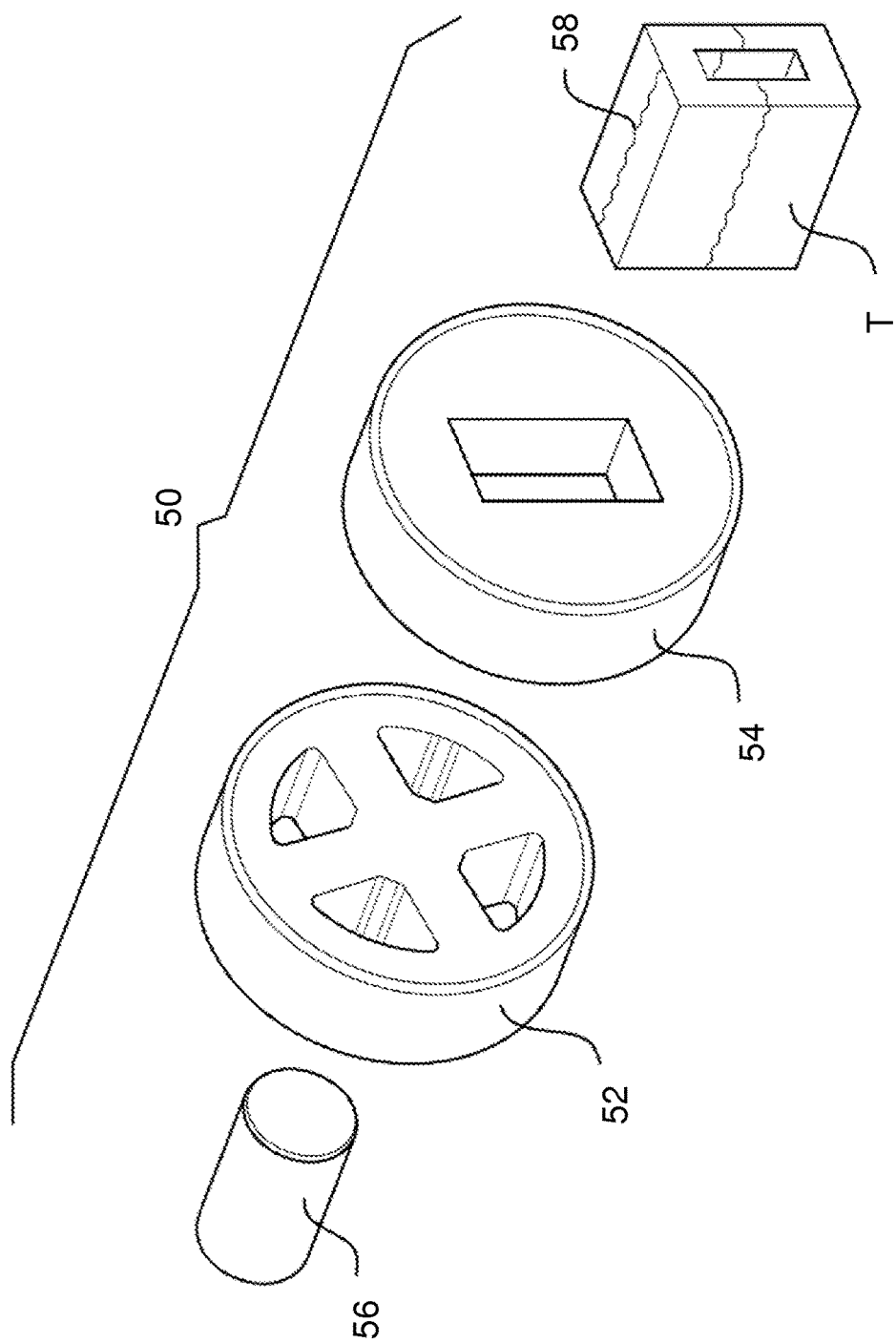
FIG. 2 is an exploded perspective view of a porthole die through which the aluminum material is extruded to form an extruded aluminum tube.

Referring to FIG. 2, one example of a process for hydroforming an extruded structural tube is illustrated. The process begins by forming an extruded structural tube in a porthole die. Referring to FIG. 2, one example of a porthole extrusion die 50 is illustrated. The porthole extrusion die 50 includes a mandrel plate 52 and a cap section 54. An aluminum billet 56 is heated and extruded through the porthole extrusion die 50 at high temperature and pressure. The extruded aluminum is separated in the mandrel plate 52 and re-converges in the cap section 54. The point that the aluminum re-converges creates weld lines 58 in the extruded tube T. The extruded tube T may be referred to as a structural extruded tube. The extruded tube T is formed in a continuous mill operation. After extruding, the tube T is cut to a desired length by laser trimming or other appropriate operation. As should be appreciated, for the making of vehicle rails, the tube T may be extruded with a round cross section having a diameter of about 5.08 cm, a thickness of either 2.8 mm or 3.5 mm and a T4 temper. Tolerances are maintained to ½ those established by the Aluminum Association.

The process illustrated in FIG. 2 refers to the production of extruded structural aluminum tube. While extruded structural aluminum tube may be utilized in the present value stream process 10, the process isn't limited to the list of that tube. Other extruded aluminum tube may be utilized in the process if desired including seam welded tube and extruded seamless tube.

Rotary-Draw Bending Operation

In one possible embodiment, the extruded aluminum tube T is subjected to a rotary-draw bending operation utilizing equipment including a mandrel with galling-resistive inserts.

Referring now to FIG. 3a, a portion of a mandrel-ball assembly 100 is illustrated in an end-perspective view. FIG. 3b depicts a cross-sectional view taken in the direction of arrows 3B-3B. Generally, the mandrel-ball assembly 100 includes a ball body 112 and a galling-resistive insert 120, which is retained in place by a securing mechanism 122.

The illustrated embodiment includes the ball body 112 that is generally symmetric about centerline axis 114. Outer surface 116 of ball body 112 includes indentation 118, and insert 120 is at least partially positioned within indentation 118.

In the figures, the insert 120 comprises a ring of material that is generally symmetric about centerline axis 114 and extends 360° about the outer surface 116 of ball body 112. Securing mechanism 122 is placed adjacent to insert 120 and retains insert 120 within indentation 118. In the embodiment shown, securing mechanism 122 includes holding ring 124 that captures insert 120 within indentation 118. Securing mechanism 122 also includes a plurality of separate fasteners 126A-E that secure holding ring 124 to ball body 112. Separate fasteners 126A-E may be threaded or unthreaded or may be of any type known by one skilled in the art. FIG. 4 depicts an exploded view of the mandrel-ball assembly of FIGS. 3a and 3b, including ball body 112, insert 120, holding ring 124, and separate fasteners 126A-E.

Other securing mechanisms might also be used to retain the insert 120 in position. For instance, holding ring 124 may be secured to ball body 112 by mating together a threaded surface (male or female) on holding ring 124 with a complementary threaded surface (female or male, respectively) on ball body 112. That is, both the ball body 112 and the securing mechanism 122 might both be threaded and screwed together. In addition, holding ring 124 may be integrally formed with insert 120 creating a separate subassembly that is then secured to ball body 112 using any of the methods described. Other securing mechanisms, such as welding, adhesion, an interference fit, or a transition fit may also be used for embodiments that fall within the scope of the disclosed invention.

Insert 120 is positioned on the portion or portions of mandrel-ball assembly 100 that experience relatively high normal contact forces with an inner surface of a tubular blank during a bending operation. In one embodiment, insert 120 includes a single contiguous piece of material that at least partially circumscribes the outer surface 116. In an alternative embodiment, the insert 120 includes a discrete number of non-contiguous pieces of material that are shaped as incomplete arcs or triangles and that are spaced apart and around the outer surface 116. Insert 120 may include a uniform or non-uniform cross-sectional shape.

Insert 120 includes a galling-resistive material, which may include a plastic material, a low-stacking-fault-energy metal or metallic alloy (e.g., a copper-, bronze-, or cobalt-based alloy), a material that is metallurgically-incompatible with the tubular blank (i.e., insoluble solids), a low-friction material and any combination thereof. Suitable plastic material includes, but is not limited to, nylon, polytetrafluoroethylene, polyoxymethylene, polyurethane, and polyethylene, or any combination thereof. Generally, the hardness of the galling-resistive material should be less than the hardness of the tubular blank in which the mandrel-ball assembly will be used during bending.

Figure 5A:
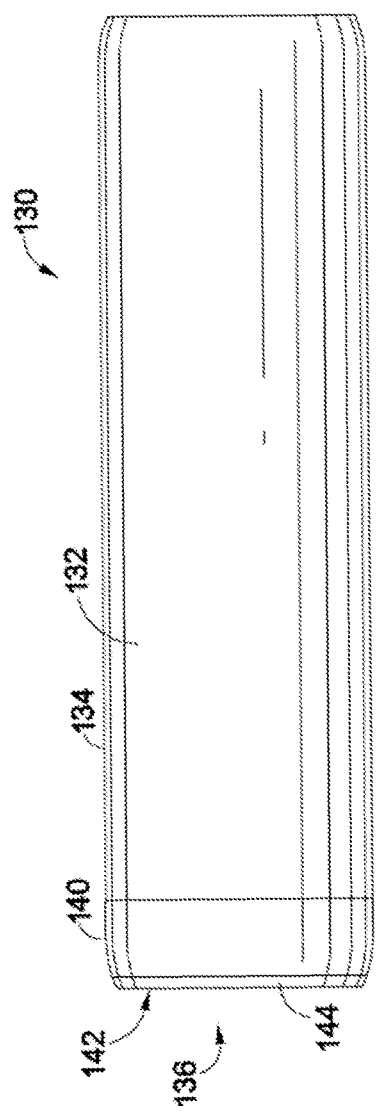
FIG. 5a is a mandrel-shank assembly.
Figure 5B:
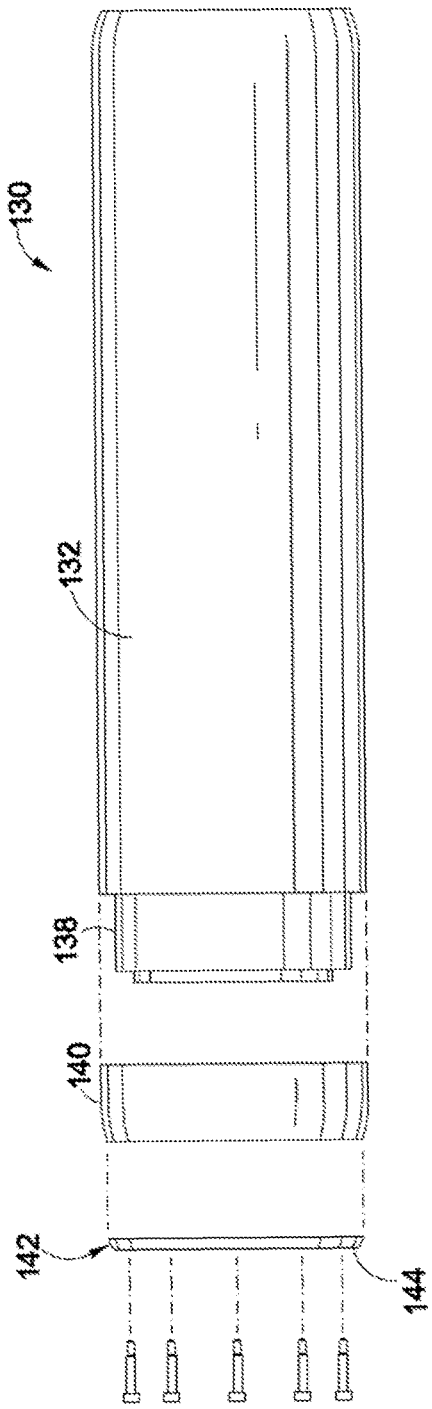

Referring now to FIGS. 5a and 5b, a side-perspective view of a mandrel-shank assembly 130 is depicted. The illustrated embodiment includes generally cylindrical shank body 132 that includes a circular cross-sectional area and an outer surface 134 defined by a length. Nose 136 of shank body 132 is the leading end of the mandrel-shank assembly when inserted into a tubular blank for bending.

Generally, nose 136 experiences relatively high normal contact forces with an inner surface of a tubular blank during a bending operation. Similar to the mandrel-ball assembly described above, outer surface 134 of shank body 132 includes indentation 138. Insert 140 is at least partially positioned within indentation 138. Insert 140 comprises a ring of material that extends about the outer surface 134 of shank body 132. Securing mechanism 142 is placed adjacent to insert 140 and retains insert within indentation 138. Securing mechanism 142 includes holding ring 144 that captures insert 140 within indentation 138.

As similarly described above for securing mechanism 122, securing mechanism 142 may retain insert 140 in indentation 138 by threading holding ring 144 onto shank body 132 using complementary male/female threaded surfaces or may include a plurality of separate fasteners that secure holding ring to shank body. Separate fasteners may be threaded or unthreaded or may be of any type known by one skilled in the art. Additionally, holding ring 144 may also be integrally formed with insert 140 creating a separate subassembly that is then secured to shank body 132 using any of the methods described herein.

Insert 140 is positioned on a portion of nose 136 of shank body 132. Similar to insert 120 described above, insert 140 includes a galling-resistive material, which may include a plastic material (e.g., nylon, polytetrafluoroethylene, polyoxymethylene, polyurethane, polyethylene, etc.), a low-stacking-fault-energy metal or metallic alloy (e.g., a copper-, bronze-, or cobalt-based alloy), a material that is metallurgically-incompatible with the tubular blank (i.e., insoluble solids), a low-friction material, and any combination thereof. Generally, the hardness of the galling-resistive material should be less than the hardness of the tubular blank in which the mandrel-ball assembly will be used during bending. In addition, Insert 140 may include a single contiguous piece of material or may be formed of a discrete number of non-contiguous pieces of material and may include a uniform or non-uniform cross-sectional shape.

Figure 6:
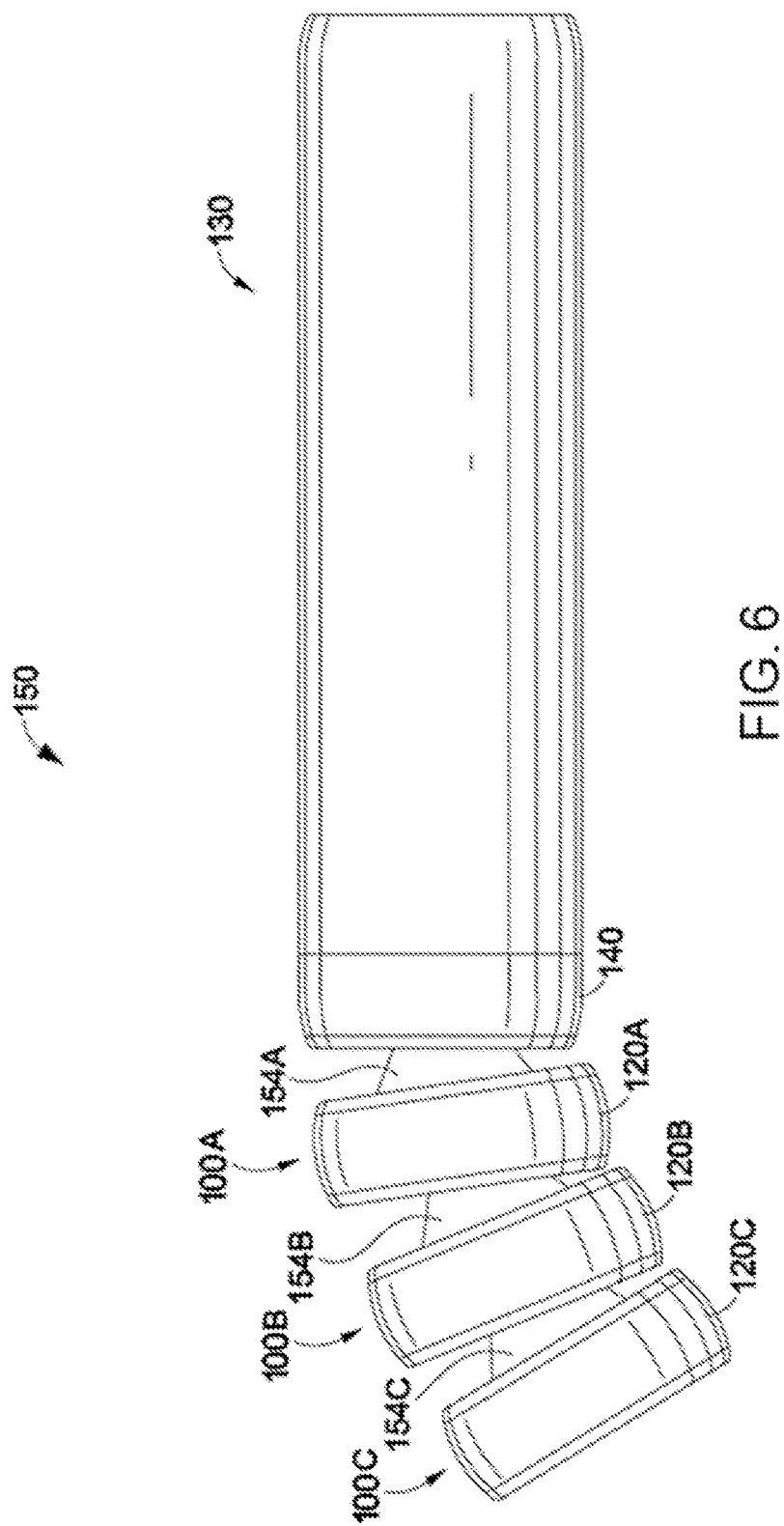
FIG. 6 is a mandrel assembly comprising a mandrel-shank assembly and a plurality of connected mandrel-ball assemblies.

Referring now to FIG. 6, an exemplary mandrel assembly 150 comprising a mandrel-shank assembly 130 and a plurality of connected mandrel-ball assemblies 100A-C is depicted. At least one mandrel-ball assembly 100A is connected to the nose 136 of mandrel-shank assembly 130 by way of an articulating link 154A. Additional mandrel-ball assemblies (e.g., 100B and 100C) may be connected to mandrel-ball assembly 100A in series by way of additional articulating links (e.g., 154B and 154C). Articulating links 154A-C may be of any form known by a person skilled in the the art (e.g., a spherical joint, an H-type link, poppit link, end link, etc.). Alternatively, mandrel-ball assemblies 100A-C may be connected to mandrel-shank assembly 130 by way of a cable onto which the mandrel-ball assemblies 100A-C are strung.

Insert 140 and inserts 120A-C may include the same galling-resistant material or the same combination of materials in accordance with embodiments described herein. Alternatively, insert 140 and one or more of insert 120A, 120B, and 120C may each include a different galling-resistant material or combination of materials in accordance with embodiments described herein.

Figure 7:
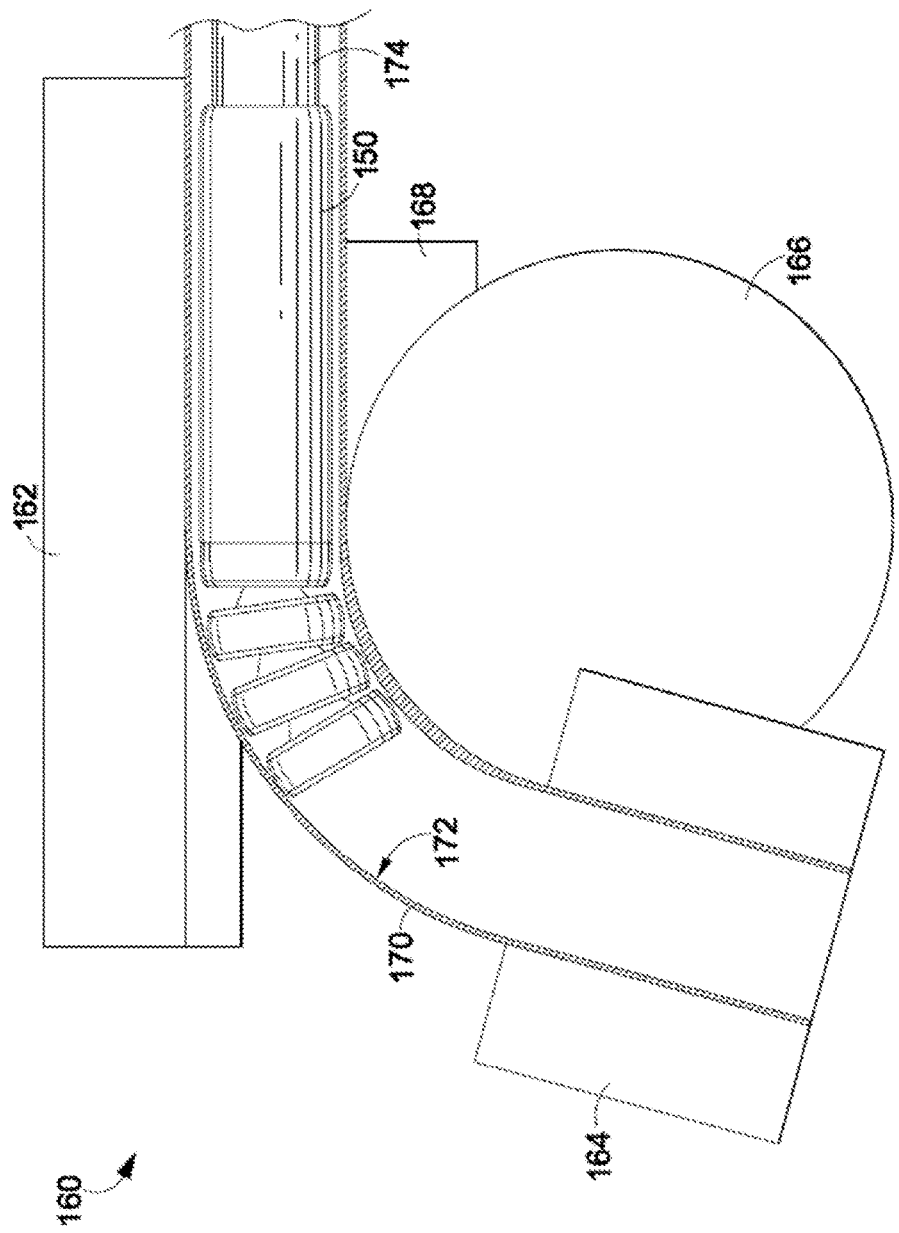
FIG. 7 is a plan view of a rotary-draw bending mechanism having a follower, clamp, bending die, wiper and mandrel assembly used to bend the extruded aluminum tube prior to hydroforming.

Referring now to FIG. 7, a plan view of an exemplary rotary-draw bending mechanism 160 having a follower 162, clamp 164, bending die 166, wiper 168, and mandrel assembly 150 connected to rod 174. The leading edge of an extruded aluminum tube/workpiece W is clamped (using clamp 164) to bending die 166. Mandrel assembly 150 is placed within workpiece W. An outer surface 116 of ball body 112 and an outer surface 134 of shank body 132 are generally shaped to fit within the workpiece W such that outer surface 116 and outer surface 134 contact an inner surface 172 of workpiece W during the bending process while allowing for the mandrel assembly 150 to be easily inserted into workpiece/tube (i.e., a small clearance fit). Bending die 166 rotates, drawing the workpiece/tube W around bending die 166. Inner surface 172 is supported by mandrel assembly 150 as the workpiece W is drawn around bending die 166. The workpiece W is externally supported by follower 162 and wiper 168. Mandrel assembly 150 helps prevent tube buckling, wrinkling, and collapse of the workpiece/tube W during the bending operation.

While bending with a mandrel has been described, it should be appreciated that "empty bending" without a mandrel may also be utilized in the overall method.

Induction Annealing Process

Figure 8:
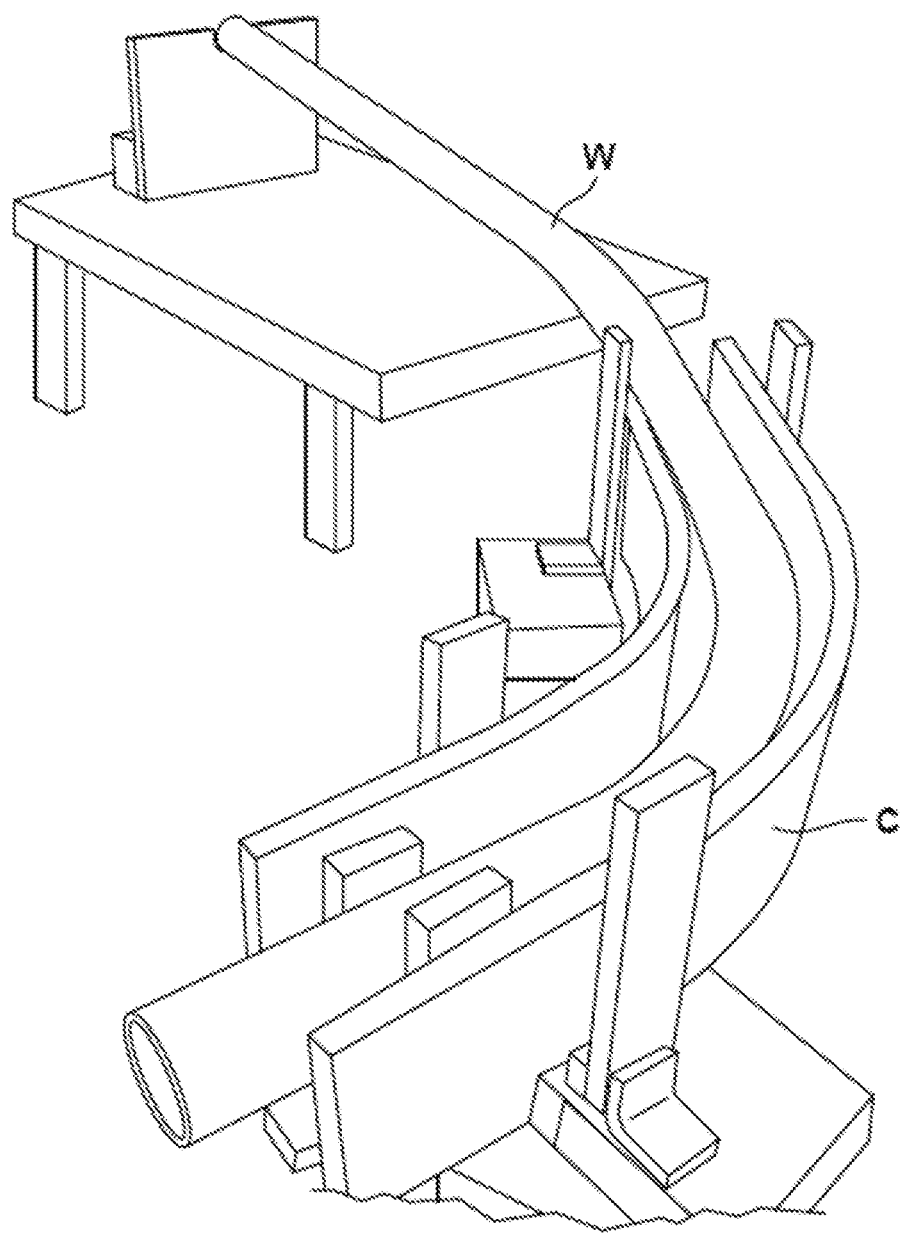
FIG. 8 is a perspective view illustrating an extruded aluminum tube workpiece received in a channel coil for purposes of induction annealing.

As previously described, the workpiece W may be subjected to induction annealing 16, 20 following bending 14 and/or following pre-forming 18. Toward this end, the workpiece W is positioned in a water-cooled copper "channel" coil C that follows the shape of the workpiece W (see FIG. 8). More specifically, alternating current flows through the channel coil C (transformer primary) to create an electromagnetic alternating field. The workpiece W forms the transformer secondary. Heating efficiency and uniformity is achieved through coil design and contouring of the coil relative to the workpiece shape.

Figure 9:
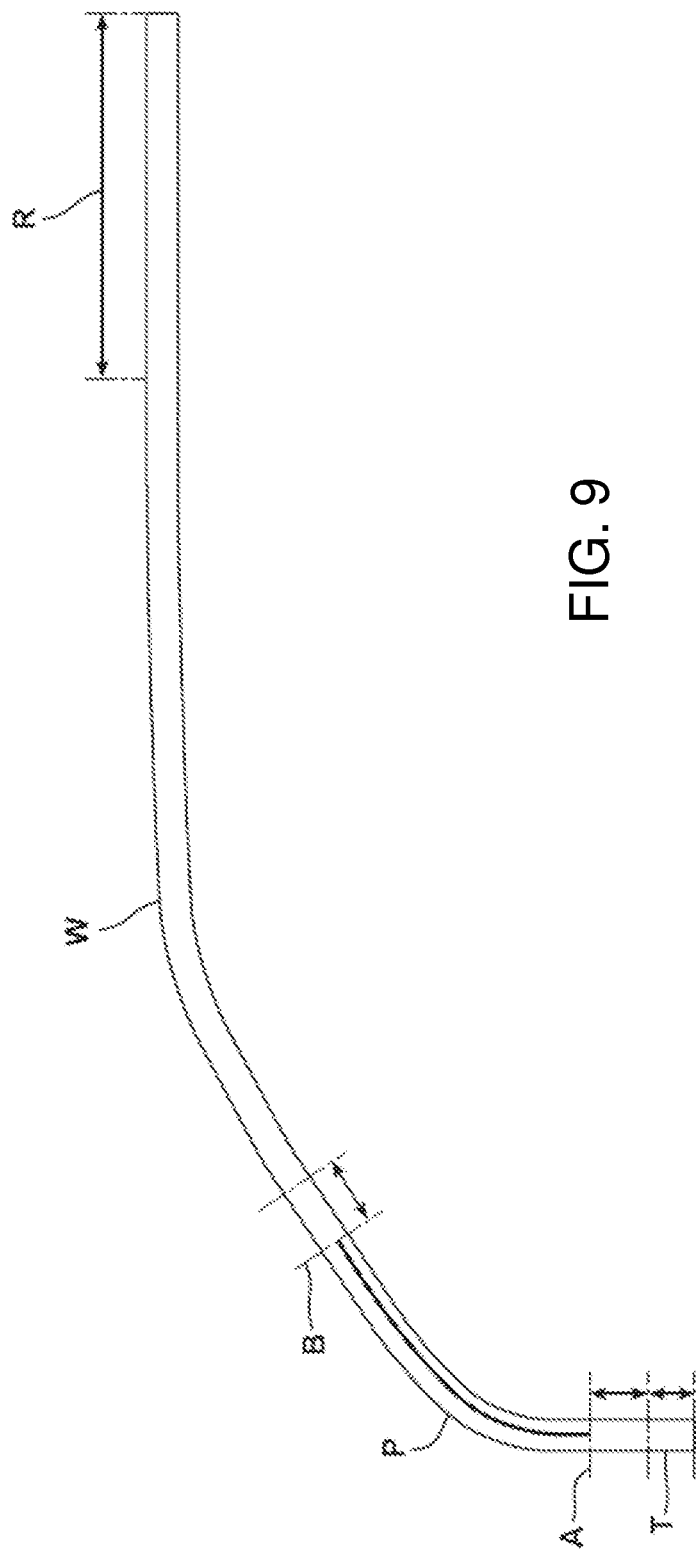
FIG. 9 is a top plan view of the extruded aluminum tube workpiece illustrating an A-frame roof rail and the A-pillar portion of the A-pillar roof rail subjected to induction annealing.

FIG. 9 illustrates the workpiece W including the A-pillar portion P where induction annealing is completed from point A to point B. Portion T indicates the part of the workpiece W that is trimmed during the process as will be described in greater detail below. Note the roof rail portion R of the workpiece W may be of different lengths depending upon the body style of the vehicle (e.g. regular cab, extended cab, crew cab).

In one embodiment, induction annealing is completed at a temperature of between 120-160° C. utilizing a 10-30 second ramp time. In another useful embodiment, induction annealing is completed at a temperature of 130-150° C. utilizing a ramp time of 20-30 seconds. In another useful embodiment, induction annealing is completed at a temperature of 135-145° C. utilizing a ramp time of 20-30 seconds. In yet another useful embodiment, induction annealing is completed at a temperature of about 140° C. utilizing a ramp time of 25-30 seconds.

In the embodiments of a method of hydroforming a workpiece W illustrated in FIGS. 1a and 1b, the workpiece W comprises an extruded aluminum tube but it should be appreciated that the workpiece may assume other forms or be made from other metals. The method includes bending of the workpiece W into a first preliminary shape (see step 14). This is followed by the induction annealing of the workpiece W in the manner previously described (see step 16). The induction annealing process 16 utilizes current to locally heat the workpiece W in order to alleviate excessive strain hardening within the workpiece thereby allowing for increased formability during later stages of the hydroforming method.

This is then followed by the pre-forming of the workpiece W into a second preliminary shape (note step 18). This is then followed by a second induction annealing step 20. Next is the hydroforming of the workpiece W to a desired final shape (note step 22). Subsequent to hydroforming, the workpiece W is subjected to trimming to a desired length (note step 24). Following trimming, in the embodiment illustrated in FIG. 1a, the workpiece W is subjected to a heat treatment in order to impart desired strength properties to the workpiece W (note step 26). In the illustrated embodiment the heat treatment is a T6 treatment at 180° C. for six hours in order to induce or impart an average yield strength of typically 290 MPa to the workpiece W. In alternative embodiments the heat treatment may be completed at temperatures between 160-200° C. for 4 to 10 hours. The workpiece W is then subjected to batch chemical pretreatment in step 28.

In an alternative embodiment of the production method illustrated in FIG. 1b, the artificial aging step 26 and batch chemical pretreatment step 28 are performed in the reverse order.

While two incremental induction annealing steps 16, 20 are illustrated in FIGS. 1a and 1b it should be appreciated that in one possible alternative embodiment only the induction annealing step 16 following pre-bending 14 is completed. The second induction annealing step 20 is not. In still another alternative embodiment, only the induction annealing step 20 is completed. The first induction annealing step 16 is not.

Any of the production method embodiments are particularly useful in the production of pickup truck roof rails which undergo significant bending of about 45° at the A-pillar portion P (see FIG. 9) in order to support the transition of the workpiece W from the A-pillar into the hinge pillar.

Figure 10:
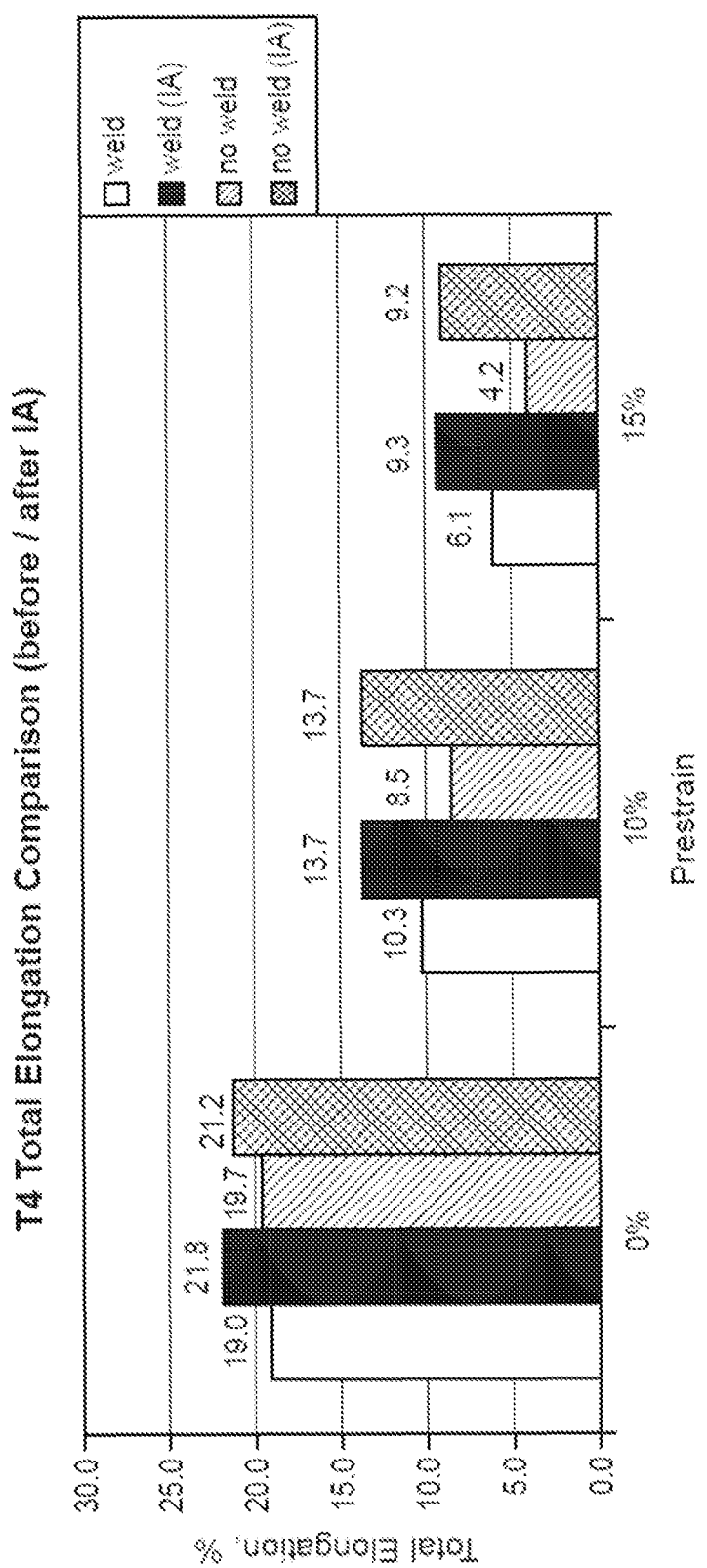
FIG. 10 is a graphical illustration of T4 total elongation before and after induction annealing of tensile samples cut from extruded tube and subject to pre-straining. Such samples behave similarly to and are representative of A-pillar roof rail response.
Figure 11:
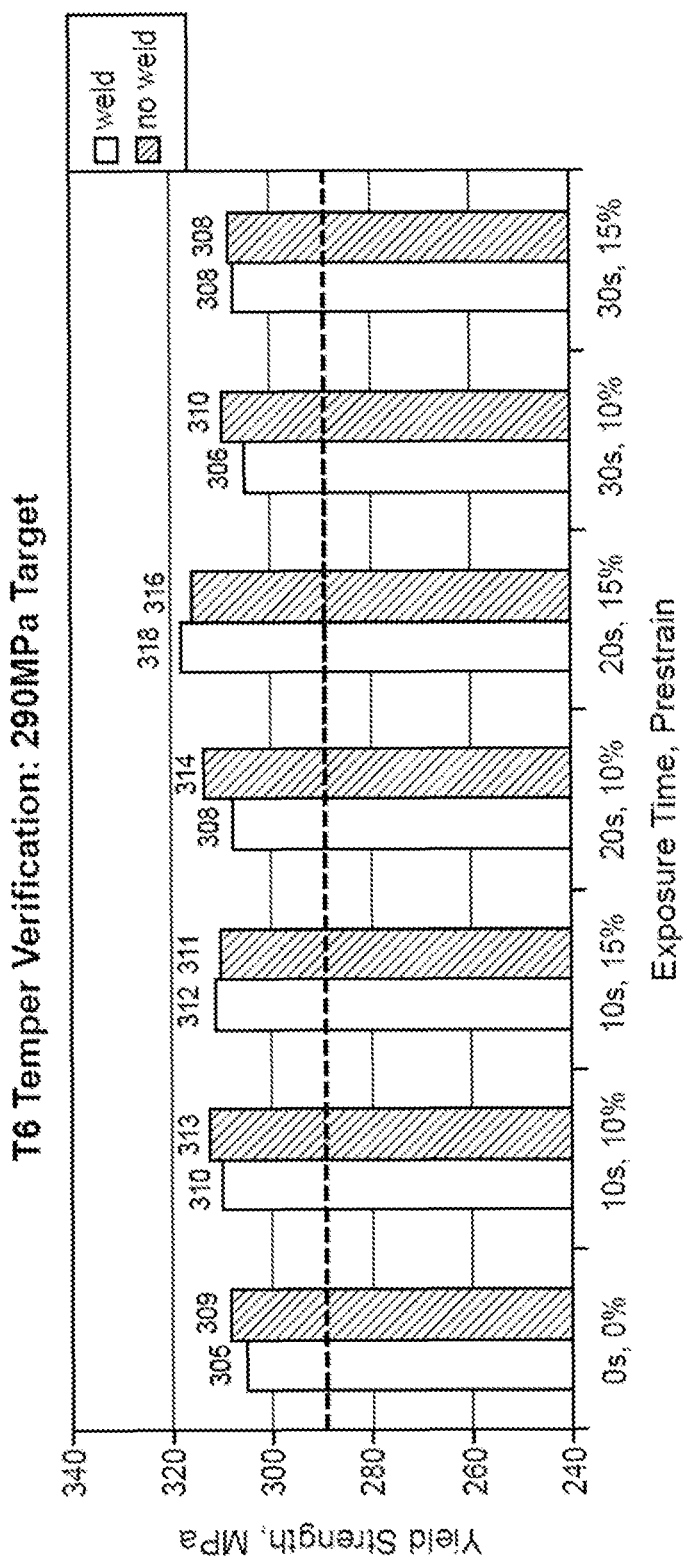
FIG. 11 is a graphic illustration of T6-Temper verification confirming that A-pillar roof rails undergoing induction annealing still reach their desired yield strength after T6 heat treatment.

The data presented in FIGS. 10 and 11 shows that the induction annealing step or stage 16, 20 allows for an increase in material total elongation (strain) when used (note "IA" parts and also note that "weld" and "no weld" identifies where the tensile sample was cut from the structural tube). In fact upward of double the initial material strain capability is provided in high strain regions. Additionally, and surprisingly, no degradation to T6 Temper or heat treatment properties is observed when induction annealing is completed at temperatures between 120-160° C. for 10-30 seconds. Thus, total elongation is increased while the yield strength of the final workpiece product remains uncompromised. Such a combination of beneficial results could not have been anticipated.

Advantageously the induction annealing 16, 20 helps support high volume automotive manufacturing. Both structural and seamless tubes benefit from the method. In fact, structural tubes may now be readily used in the production of difficult-to-form A-pillar roof rails. Thus, the method allows for the use of a higher tolerance and more manufacturing efficient material for hydroforming roof rails.

As should be appreciated the induction annealing process 16, 20 is restricted to the heated region of interest only: that is, the area of bending where plastic strain capability has been reduced by the bending and/or pre-forming steps of stages 14, 18 of the production process. Heating of the tube or workpiece W is localized to the induction annealed region, therefore, there is no specialized equipment required for material handling of the workpiece in the unheated regions. Further the induction annealing parameters required to restore formability to the workpiece W do not cause post-hydroformed material heat treatment response damage and the formed workpieces (in the illustrated embodiment, A-pillar roof rails), are still able to demonstrate the desired yield strengths.

Hydroforming Process

Figure 12A:
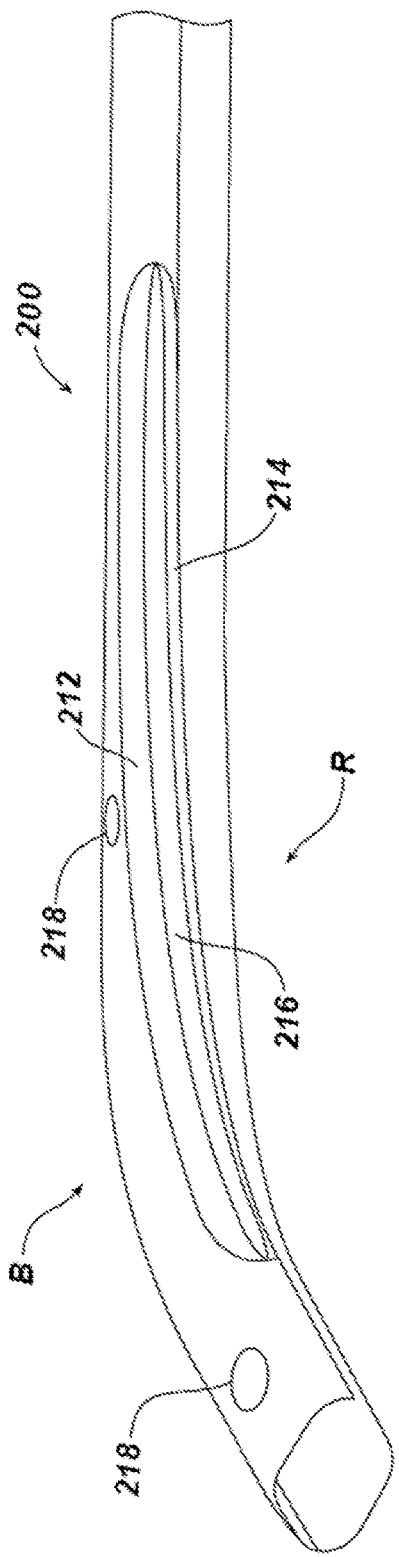
FIGS. 12a and 12b are respective perspective and top plan views illustrating the intermediate segment of the inner radius of a bend in the hydroformed rail which has been processed to reduce strain and prevent splitting.
Figure 12B:
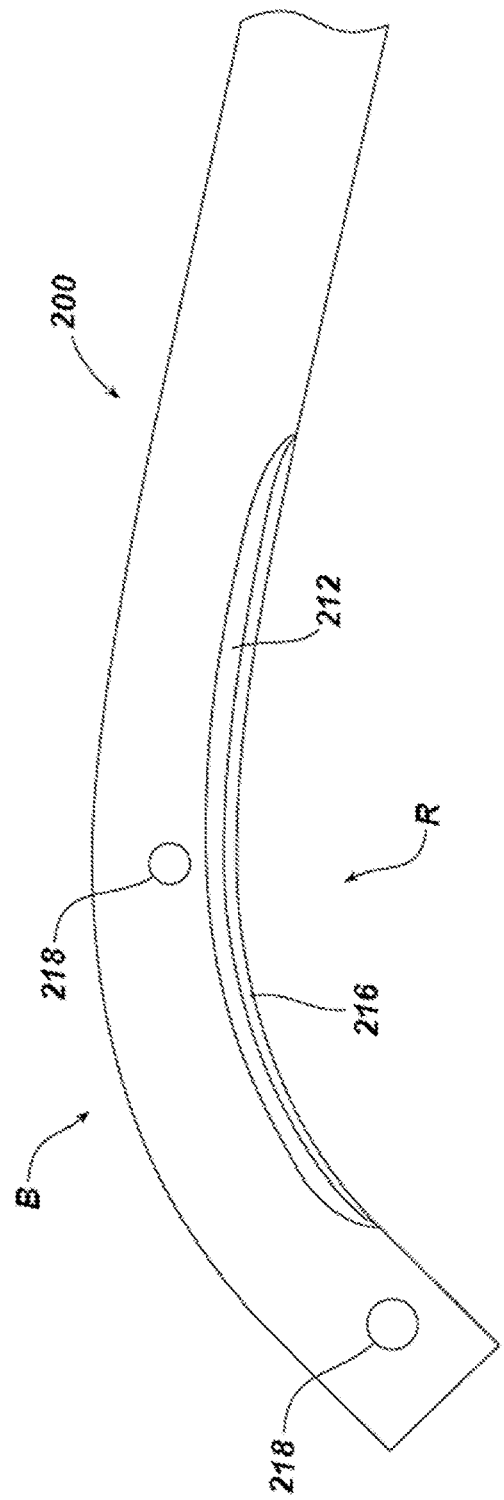
Figure 14:
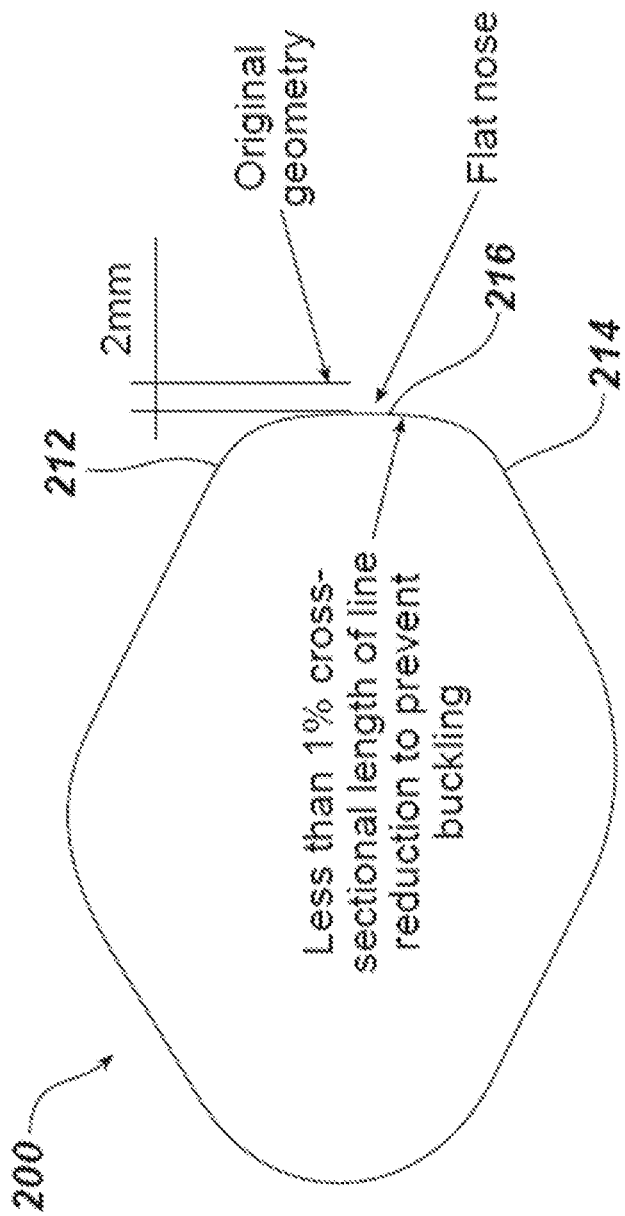
FIG. 14 is a detailed schematical illustration of the cross-sectional length of line reduction provided to the rail during hydroforming.

Reference is now made to FIGS. 12a and 12b illustrating a vehicle rail 200 made by hydroforming in accordance with the specific teachings described herein. The rail 200 includes a bend B. The inner radius or flat nose radius R of bend B is formed by a cross-section of non-constant radius including a first transition segment 212, a second transition segment 214 and an intermediate segment 216 between the first and second transition segments. See also FIG. 14 showing outline of rail 200 at bend B.

As previously noted, the process of forming the rail 200 may begin by extruding a structural aluminum alloy tube in a porthole die 50 including a mandrel plate 52 and a cap section 54. More specifically an aluminum billet 56 is heated and extruded through the porthole extrusion die 50 at high temperature and pressure. The extruded aluminum is separated in the mandrel plate 52 and reconverges in the cap section 54. The extruded aluminum tube may be referred to as a structural extruded tube. The tube is formed in a continuous mill operation and is cut to a desired length after extruding.

Next the extruded aluminum tube may be bent in a desired manner utilizing any bending process (rotary draw, push-roll, etc.). This may be followed by an intermediate forming operation (i.e. preforming). Further the extruded tube or workpiece may be subjected to induction annealing after bending, after preforming, or after both in order to restore some formability to the extruded tube or workpiece.

After the extruding, bending, preforming and annealing preliminary operations and processes discussed above, the bent and preformed extruded aluminum tube or workpiece W is loaded into a hydroforming die which is schematically illustrated as a two piece die D1, D2 in FIGS. 13a-13e.

Figure 13C:
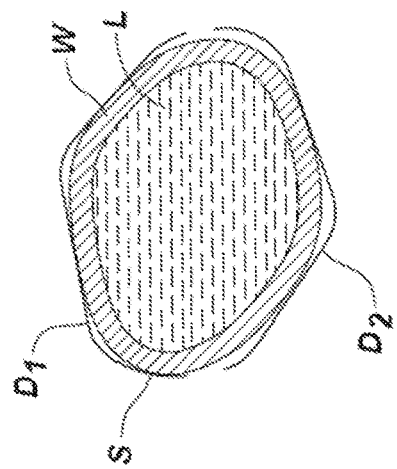
FIGS. 13a-13e illustrate pressure sequence hydroforming of the extruded aluminum tube.
Figure 13B:
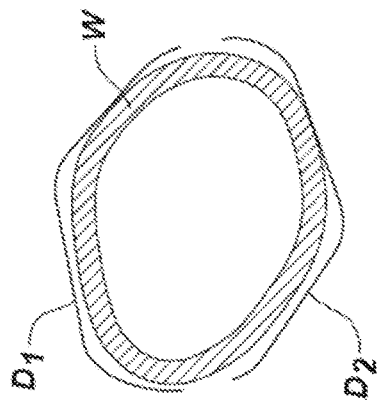
Figure 13A:
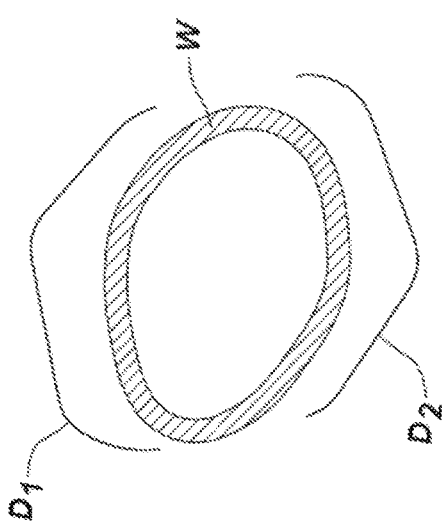
Figure 13E:
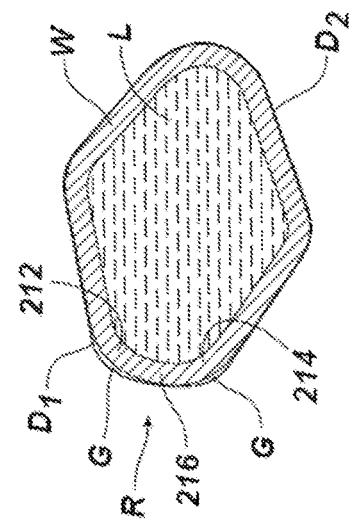

Following loading of the workpiece or tube W into the die D1, D2, the die is closed (see FIGS. 13a and 13b). Upon reaching the partially closed position illustrated in FIG. 13c, a liquid L under a first level of pressure is introduced into the interior of the workpiece W. The first level of pressure is within the range of approximately 0 to 200 bar. In another embodiment the first level of pressure is within the range of 50 to 150 bar. In yet another possible embodiment the first level of pressure is approximately 100 bar. The hydroforming liquid L may be water or other appropriate material.

As should be further appreciated from viewing FIG. 13c, the upper portion of the die D1 includes a flat nose wall section S that is specifically shaped to make contact with the workpiece W at the point in the hydroforming process when the die D1, D2 is only partially closed and the first level of pressure is being applied to prevent the tube from collapsing during the closeout stage. This point of contact forms the intermediate section 216 of the flat nose corner radius R of the rail 200. This reduces the circumferential outer fiber strain and ductility required to form the workpiece W into the part or rail 200 along the inside of the bend where the material thickens.

Figure 13D:
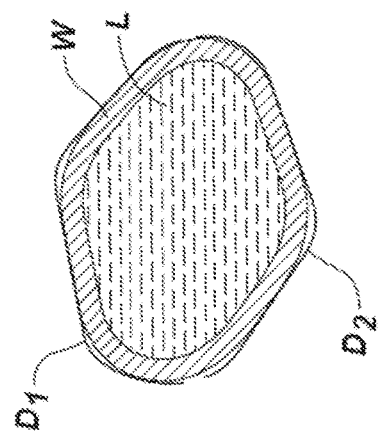

The next step in the hydroforming process is to completely close the hydroforming die D1, D2. FIG. 13d illustrates the die D1, D2 as it is being closed around the workpiece W. After the die D1, D2 is fully closed around the workpiece W, the pressure of the liquid L filling the workpiece W is increased to a second level of pressure to form and hydro-pierce the workpiece W. The second level of pressure is within the range of 500 to 1500 bar. In another possible embodiment the second level of pressure is within the range of 750 to 1250 bar. In yet another possible embodiment the second level of pressure is approximately 1000 bar.

As the pressure is increased, the workpiece W is pressed outwardly toward the die D1, D2. Significantly, the intermediate section 216 of the flat nose corner radius R is already in engagement with the flat nose wall section S of the die D1 before the pressure of the liquid L is increased to the second level. This prevents unrestricted/unsupported cross-sectional bending during the closeout. In contrast, in a typical conventional scenario the workpiece does not contact the die wall until the die is fully closed and calibration pressure is applied. The actual curvature radius of the formed corner at the tip of the plastic hinge in this case is typically smaller than the corresponding radius of the die. Consequently, the resultant r/t ratio is also smaller than in the design and the outer fiber strain is higher. In the present method the flat nose wall section S engages the workpiece W early on during the closeout stage and prevents additional unrestricted bending substantially reducing the outer fiber strain and increasing r/t ratio. At the same time the strain in this area is almost unchanged during the calibration phase.

Figure 15:
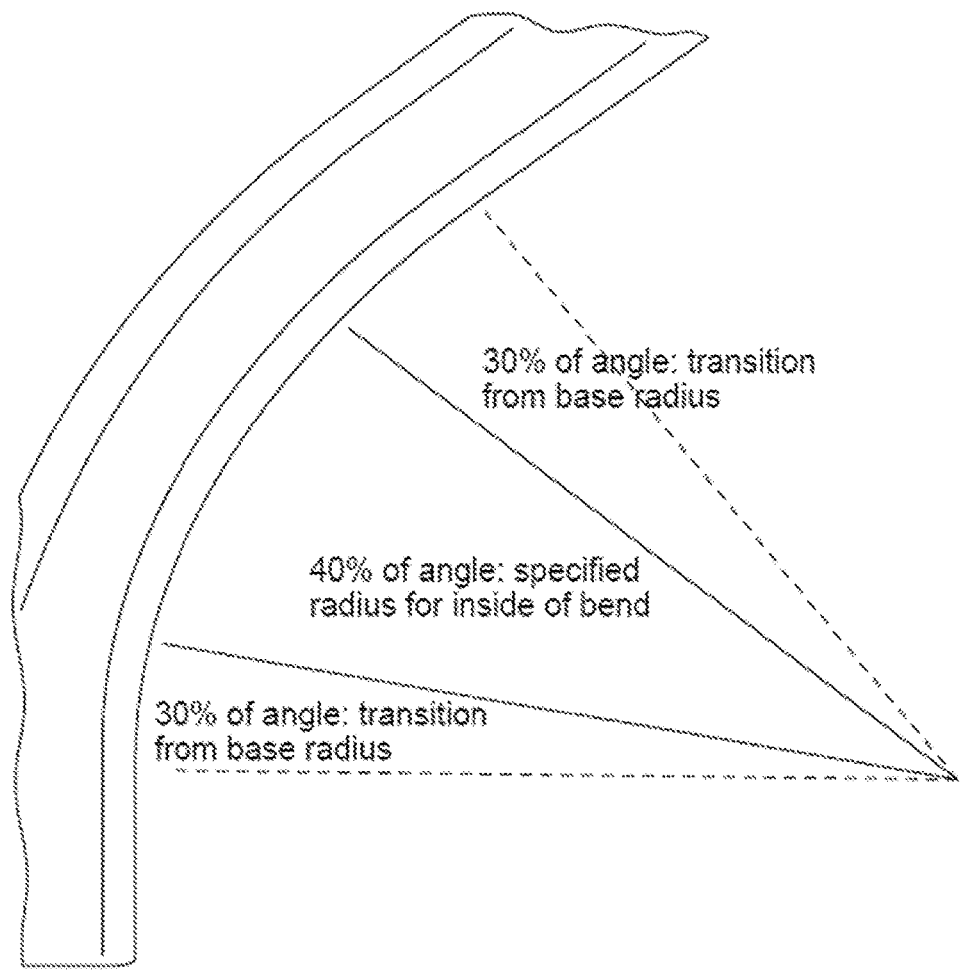
FIG. 15 is a detailed schematical illustration of a non-constant radius of the flat nose transition section.

Further, the engagement of the workpiece W with the wall section S results in a slight gap G being maintained between the die D1, D2 and the workpiece W thereby forming the first and second transition segments 212, 214 of the rail 200. Thus, it should be appreciated that the workpiece W and ultimately the rail 200 being formed in the die will have tool marks from the die D1 along the intermediate segment 216 but will be totally free of die tool marks along the first and second transition segments 212, 214. As illustrated in FIG. 15, the resulting first and second transition segments 212, 214 of the rail 200 incorporate a bend B angle where the middle 40% is extended with transition to a conventional corner shape on the remaining 30% of the angle at each end.

Following hydroforming, the workpiece W is trimmed to a final desired length by means of laser trimming or other appropriate trimming operation. Following the laser trimming operation, the workpiece, now in the form of the roof rail 200, may be heat treated to artificially age the aluminum alloy to desired strength in a manner known in the art. The rail 200 may then be subsequently subjected to chemical pretreatment to prepare it for the receipt of adhesives, paint, and/or other coating and chemicals used in a subsequent vehicle assembly operation. In an alternative embodiment, the rail 200 is subjected to chemical pretreatment before heat treatment rather than after heat treatment. Either approach may be utilized.

The following example further illustrates the method of hydroforming an extruded aluminum tube.

EXAMPLE

An extruded structural tube or seamless tube made from AA6082-T4 material has an outer diameter of 5.08 cm and a wall thickness of either 2.8 mm or 3.5 mm. The tube is positioned in the hydroforming die and the die is partially closed. The tube is then charged with a hydroforming liquid at a pressure of 100 bar to prevent tube collapsing. Continued closing of the upper die causes the tube to engage the flat nose wall section of the die which reduces the strain on the outer fiber and ductility required of the aluminum alloy in the area of the intermediate segment. The die is then fully closed and the pressure of the hydroforming liquid is increased to 1000 bar in order to complete the hydroforming process.

In summary, numerous benefits result from the pressure sequence hydroforming method disclosed in this document and schematically illustrated in FIGS. 13a-13e. As noted above, by engaging the workpiece W with the flat nose section S of the die D1 when the die D1, D2 is partially closed and the liquid is at a first, lower level of pressure it is possible to increase the minimum curvature radius formed in the tube which limits the strain on the outer fiber and prevents splitting along the intermediate segment 216. This also serves to reduce or eliminate workpiece failure and material waste resulting from the hydroforming process. After the hydroforming process is completed by fully closing the die D1, D2 and increasing the pressure of the liquid L to the second level, the inner or flat nose corner radius R of the bend B in the workpiece is provided with a cross-sectional length of line reduction of less than 1%. Significantly, that reduces the geometry of the workpiece W along the flat nose corner radius R by approximately 2 mm in width. See FIG. 14.

Batch Heat Treatment and Chemical Pretreatment Process

Reference is now made to FIGS. 16-24 generally illustrating a multipurpose rack 300 for simultaneously processing a plurality of parts P. The rack 300 comprises a frame 312, a plurality of defined locations 314 on the frame for receiving and holding individual parts P for processing and a latching assembly 316 for locking the parts to the frame in the defined locations. In one useful embodiment the rack 300 is made from stainless steel such as 316L stainless steel and the frame 312 utilizes open channel materials rather than closed boxed sections in order to improve drainage. The rack 300 is capable of accommodating parts P of differing lengths such as A-pillar roof rails having a length depending upon cab style: regular, extended and crew cab. As will be appreciated from reviewing the following description, the rack 300 is mirrored down the centerline (defined by center rail 328 and center beam 348) thereof to aid balance through improved weight distribution and improved ergonomics for manually loading parts into the rack while utilizing minimized reach. As should further be appreciated there is a large open channel along the centerline to improve air and fluid flow which, in turn, reduces the flow path length to the parts located in the center of the rack.

As illustrated, the frame 312 includes a base, generally designated by reference numeral 320, comprising two side rails 322, two skids 324 connected to the side rails, two end rails 326 and one center rail 328. A "palate" is formed by four cross beams 330, each having a t-shaped cross section. The "palate" allows the rack to be engaged and lifted with the forks of a forklift truck (not shown).

The frame 312 further includes two opposing end assemblies 332. Each end assembly 332 comprises two corner posts 334, one center post 336, one upper cross rail 338 and one lower cross rail 340. A parts stand 342 is provided between the center post 336 and one of the corner posts 334 at each end of the rack 300. Each parts stand 342 comprises two runners 344 and four staggered end plates 346 for receiving and holding ends of the parts P in a manner that will be described in detail below.

A center beam 348, aligned with the center posts 336 and extending between the center posts and the upper cross rails 338 overlies the center rail 328. Four center posts 350 extend between the center rail 328 and center beam 348. The center posts 350 are centered on the rack 300 and overlie the "palate" formed by the cross beams 330.

Figure 16:
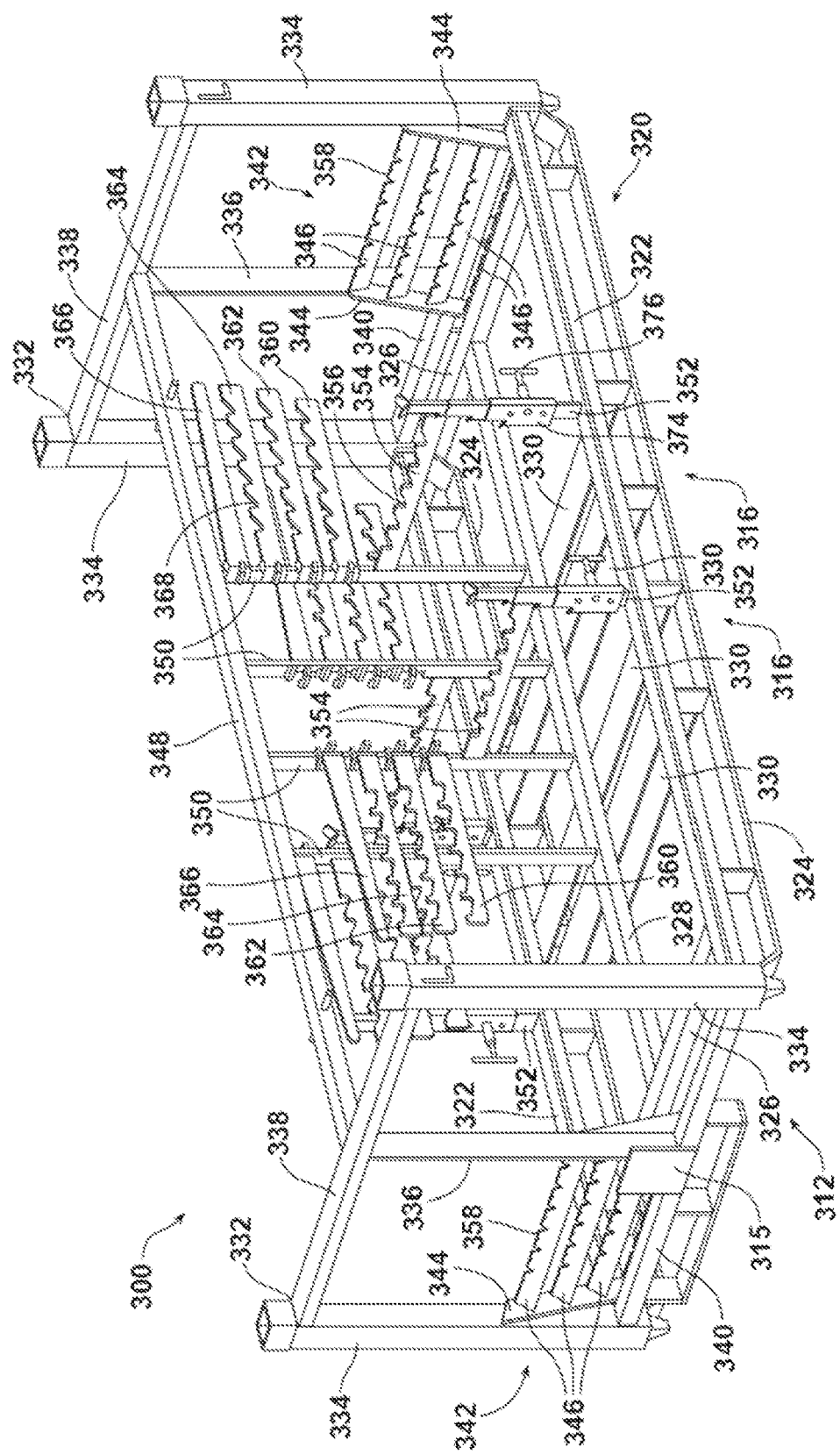
FIG. 16 is a perspective view illustrating an empty rack used to hold and batch heat treat and chemical pretreat a plurality of rails with the retaining arms and latching bars in the part loading position.

As further illustrated in FIG. 16, the frame 312 also includes four uprights 352. One upright 352 is provided aligned with each center post 350 with two of the uprights overlying each of the two side rails 322. A support arm 354 extends between each center post 350 and its cooperating, aligned upright 352. Thus each support arm 354 is fixed at one end to a center post 350 and at the other end to an upright 352.

As should be appreciated, each support arm 354 includes a plurality of part locating elements 356. In the illustrated embodiment the part locating elements 356 take the form of a plurality of spaced retaining grooves or scallops. Similarly, each plate 346 of the part stands 342 includes a plurality of part locating elements 358. In the illustrated embodiment the part locating elements 358 comprise spaced tabs.

Figure 17:
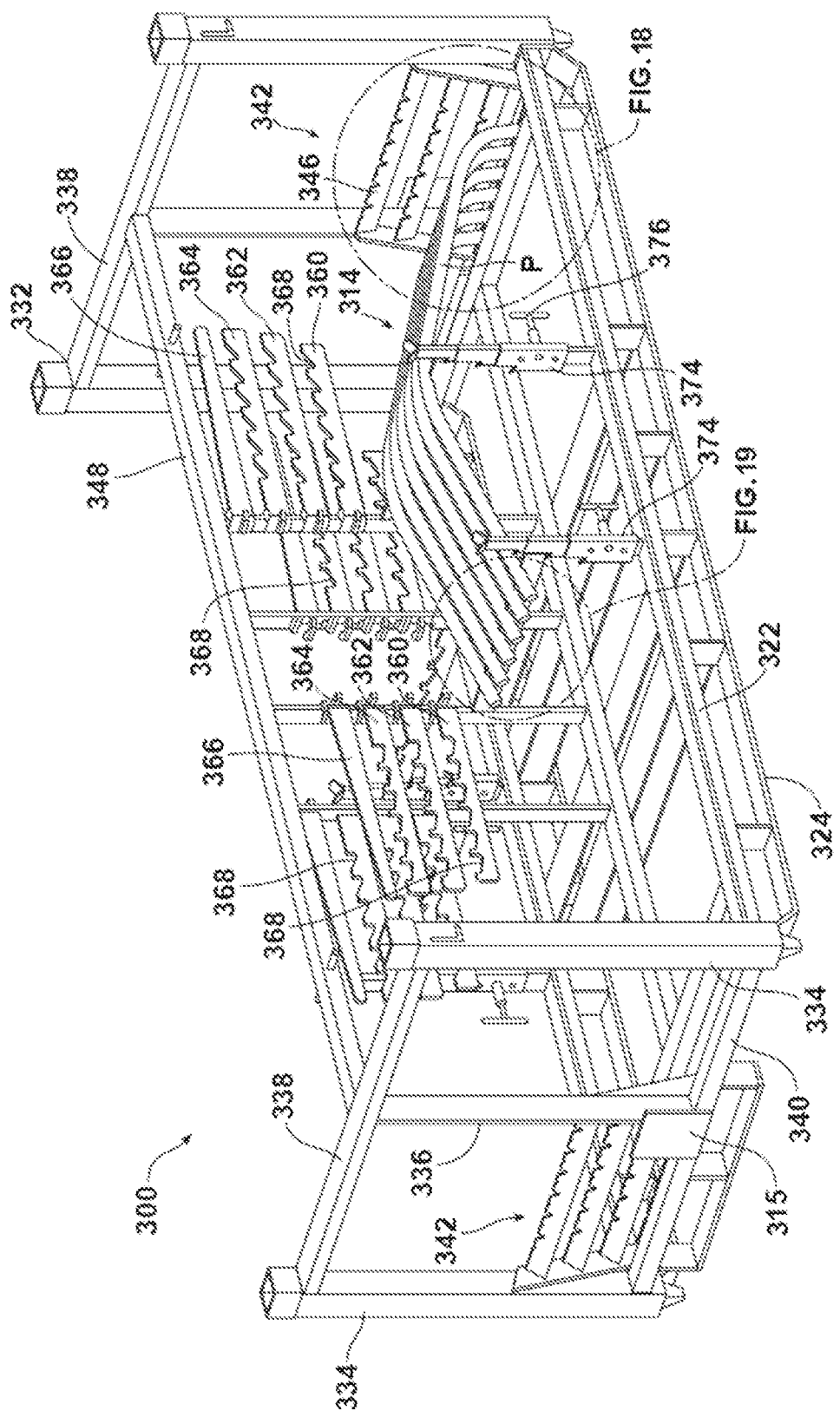
FIG. 17 is a perspective view similar to FIG. 16 but showing the first row of parts/rails loaded onto the rack.
Figure 18:
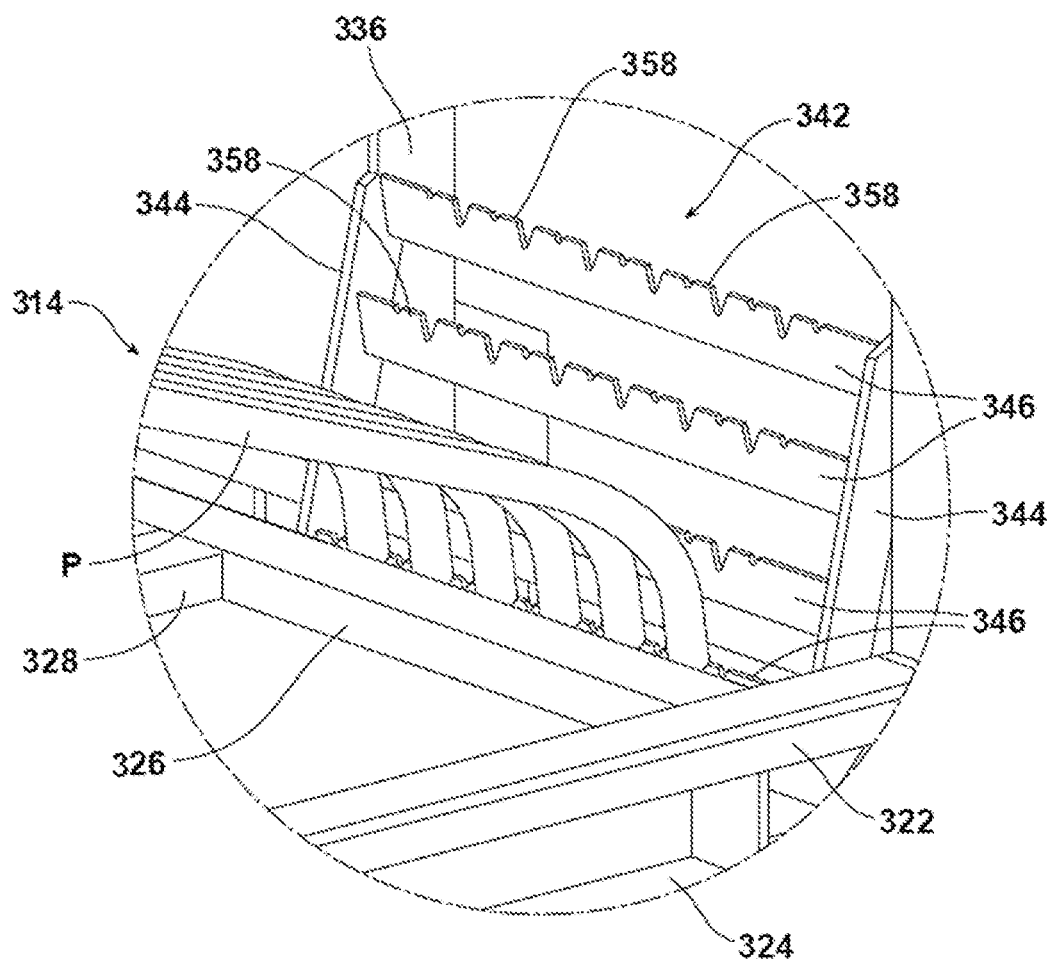
FIG. 18 is a detailed view illustrating how the open ends of a group of parts, in the illustrated embodiment pillar and roof rails, are received on the tabs provided on a part locating endplate of the rack.
Figure 19:
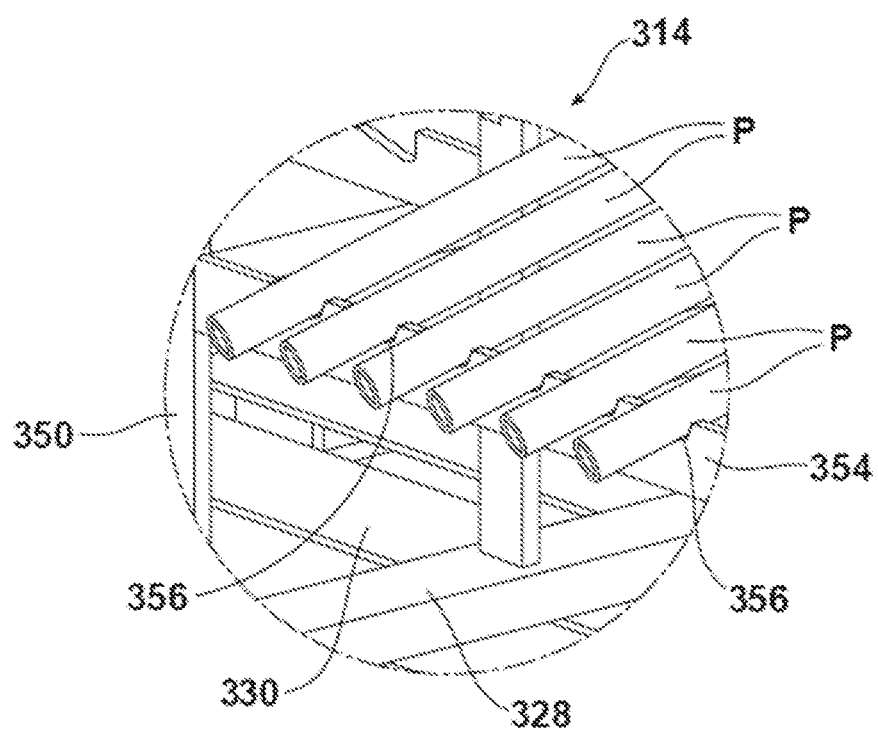
FIG. 19 is a detailed view illustrating how the parts rest in the slots, notches or grooves on the support arm.

Reference is now made to FIGS. 17-19 illustrating how a part P is loaded into the rack 300. As illustrated, an opened end of the part or roof rail P is positioned over one of the tabs 358 of the lowermost, innermost parts stand plate 346. The body of the part P is then laid into the two aligned and cooperating part locating elements/grooves 356 in the first and second support arms 354. As should be appreciated, there are six tabs 358 on the lowermost, innermost parts stand plate 346 with each tab aligned with part locating elements/spaced retaining grooves 356 in the two support arms 354. Thus, the support arms 354 and the lowermost, innermost parts stand plate 346 hold individual parts P in six defined locations 314 across one side of the frame 300. It should be appreciated that six additional parts P are held in these structures on the opposite side of the rack 300 (i.e. other side of the center beam 348), to provide for balance.

Significantly, the tabs 358 receive and hold the open ends of the parts P so that they are directed downwardly. This promotes good, efficient drainage of the parts P during chemical pretreatment when they are removed from the treatment tanks 422 (see FIG. 28 and description that follows). As an advantageous consequence, less treatment solution is transferred between tanks 422.

Referring back to FIGS. 16 and 17, the rack 300 also includes four retaining arms 360, 362, 364, 366 pivotally connected to each center post 350. As should be appreciated, each retaining arm is selectively displaceable between a part loading position, illustrated in FIG. 16, and a part securing position illustrated in FIG. 21.

As illustrated, the lowermost arm 360 is slightly shorter than the next highest arm 362, which is slightly shorter than the next highest arm 364, which is slightly shorter than the longest, uppermost arm 366. Further, each of the three lowermost arms 360, 362, 364 include a plurality of part locating elements in the form of grooves or notches 368.

Figure 20:
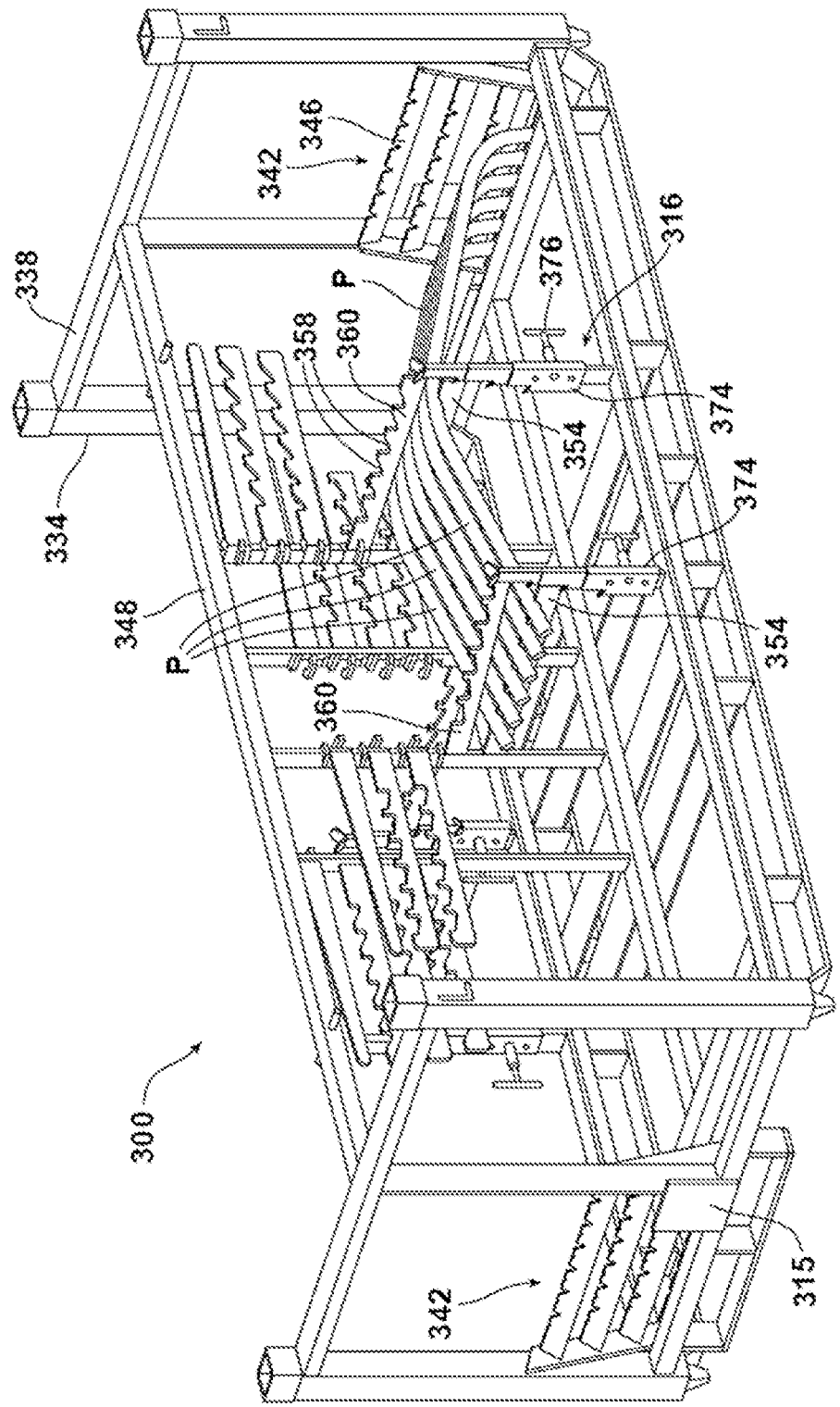
FIG. 20 is a perspective view similar to FIG. 17 showing the positioning of the two lowermost pivoting retaining arms in the part securing position so as to lie directly over the support arms supporting the first row of parts.
Figure 21:
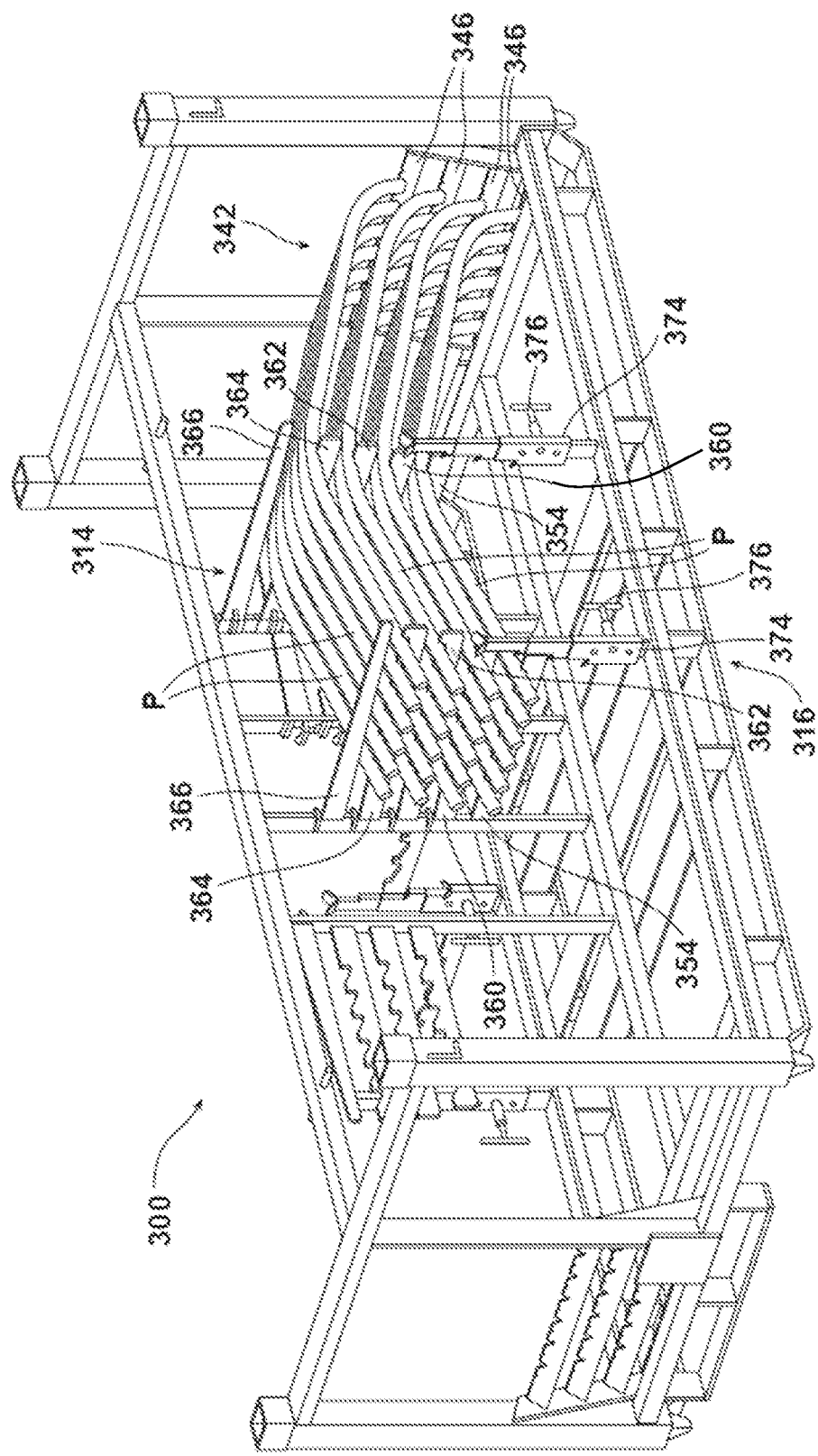
FIG. 21 is a perspective view similar to FIG. 17 showing half the rack loaded with 24 parts (roof rails) each received and held by (a) the two support arms, (b) the two lowermost retaining arms, (c) the next two retaining arms above the lowermost retaining arms and (d) the next two pivoting arms above those. The top two pivoting retaining arms are shown overlying the top row of roof rails. The stepped latching bars are shown in the lowermost, part loading position.

Once the first layer of six parts P has been positioned and located on the support arms 354 and the lowermost, innermost part stand plate 346 (as illustrated in FIG. 17), the lower most retaining arms 360 are pivoted from the part loading position illustrated in FIG. 17 to the part securing position illustrated in FIG. 20. In the part securing position, the retaining arms 360 overlie the support arms 354 and effectively capture the first row of parts P in the retaining grooves 356 thereby effectively locking those parts in their defined locations 314 on the rack. As should be appreciated, no single part P in the first row touches any other part. Thus, the parts P are fully exposed for whatever processing is desired while they are held in the rack 300.

The next row of parts P is now added to the rack 300. This is done by positioning the open ends of the next six parts on the six tabs 358 of the next highest, next innermost parts stand plate 346 and resting each part in the aligned retaining grooves 368 provided in the upper surface of the bottom most retaining arm 360. Once the six parts P of the next layer are positioned in this manner, the retaining arms 362 are pivoted from the part loading position to the part securing position. When in the part securing position the retaining arms 362 function to capture the second row of parts P in the retaining elements, grooves or notches 368 of the retaining arms 360.

Now a third row of parts P is added to each side of the rack 300. This is done by positioning the open ends of six parts P on the third parts stand plate 346 and resting the ends of the parts in the aligned cooperating parts retaining elements/grooves 368 in the retaining arms 362. Once all six parts P are properly positioned, the retaining arms 364 are pivoted from the parts receiving position to the parts retaining position. As should be appreciated, in the parts retaining position the retaining arms 364 overlie the parts in the third row thereby capturing the parts in the grooves 368 of the retaining arms 362. Thus the parts in the third row are maintained in defined locations on the frame 312 so that each individual part will not touch another part.

Now the final row of parts P is added to each side of the rack 300. To do this the open ends of six additional parts P are positioned over the tabs 358 in the uppermost parts stand plate 346 with the bodies of the parts received and resting in the aligned grooves 368 of the arms 364. When all six parts P of the fourth row of parts are properly positioned in their defined locations 314, the upper most retaining arms 366 are pivoted from the part loading position to the part securing position. As should be appreciated when the rack 300 is fully loaded and the retaining arms 360, 362, 364, 366 are all in the parts retaining position, all the retaining arms overlie the associated support arm 354 extending between the center post 350 to the cooperating, aligned upright 352. See FIG. 21.

As best illustrated in FIGS. 16, 17, 20 and 21, the latching assembly 316 includes a plurality of latching bars or slides 374. The latching bars 374 have a u-shaped cross section defining a longitudinal channel that will receive and capture the ends of the retaining arms 360, 362, 364, 366 when in the locking position.

Figure 22:
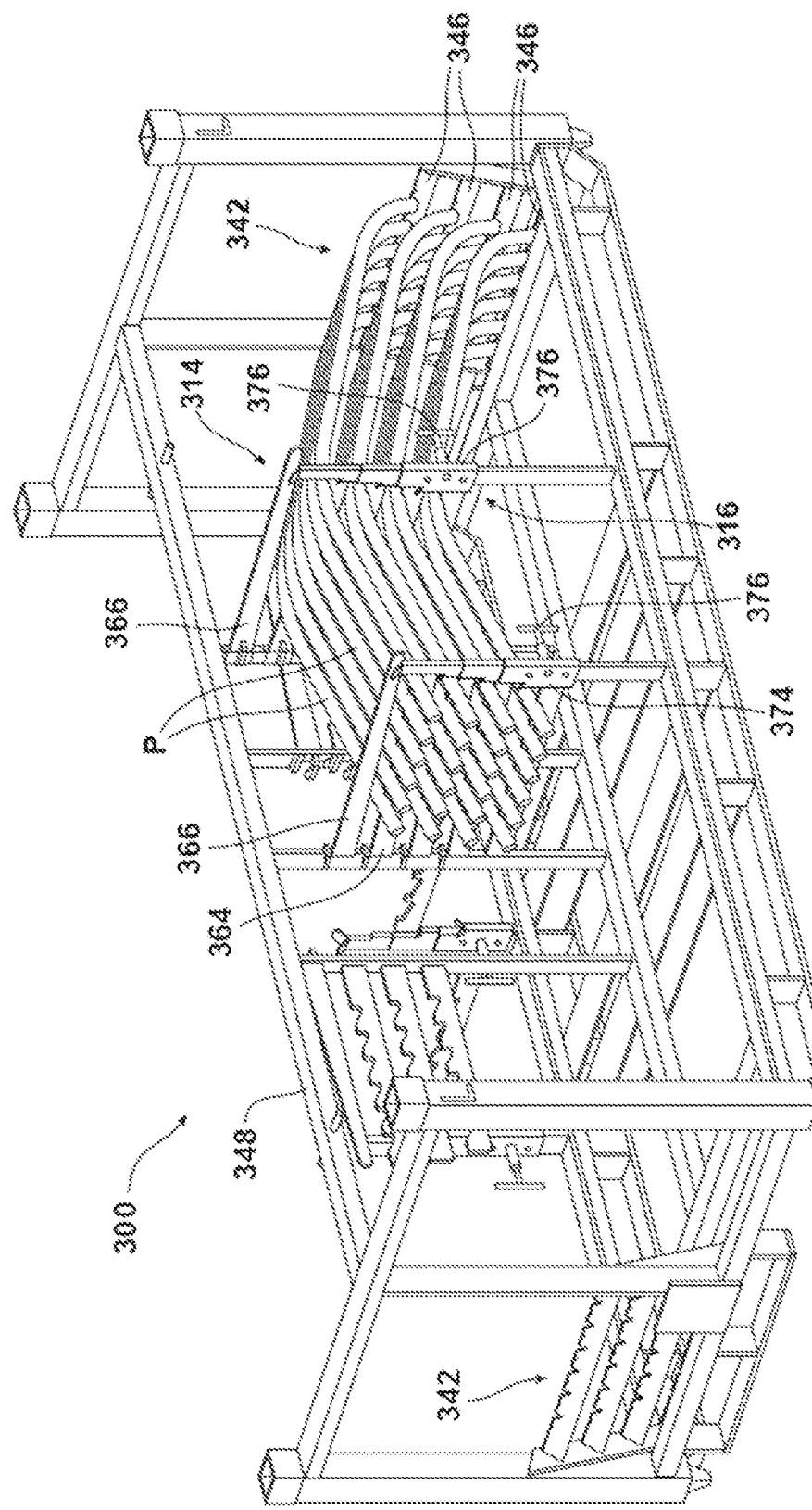
FIG. 22 is a view very similar to FIG. 21 but showing the stepped latching bars raised into the parts securing position so that the stepped latching bars engage and close the end of each pivoting retaining arm thereby latching the parts in place on the rack.
Figure 23:
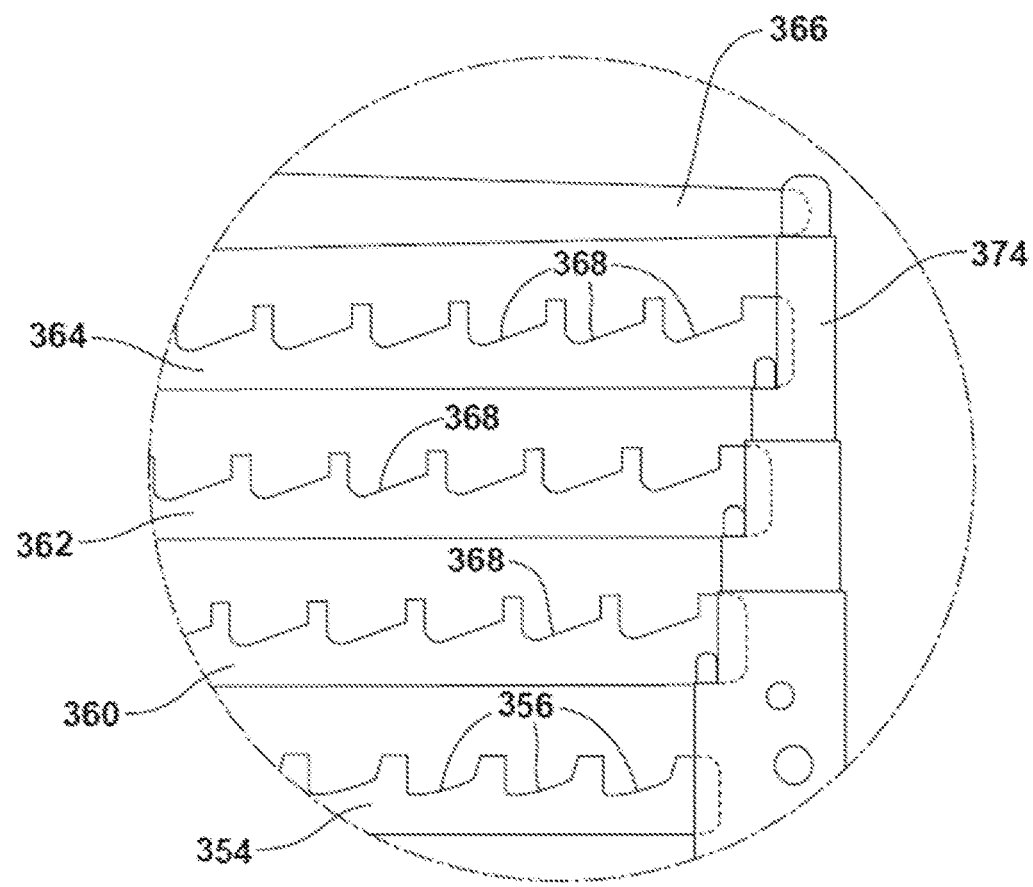
FIG. 23 is a detailed side elevational view clearly showing the different lengths of the retaining arms and how the stepped latching bar engages and captures the end of each arm when raised into the securing position.
Figure 24:
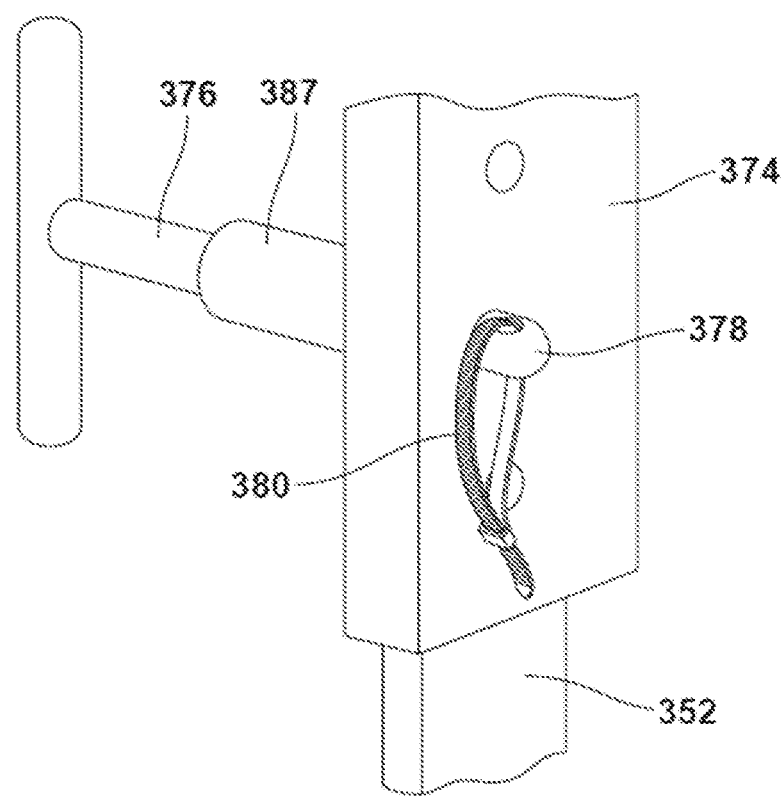
FIG. 24 is a detailed perspective view illustrating the sacrificial security tab received in one of the captive clevis pins which locks a latching bar in the parts securing position.

One latching bar 374 is slidably received on each upright 352 and is displaceable between the part loading position and the part locking position. The part loading position is illustrated in FIGS. 16, 17, 20 and 21. In this position the latching bars 374 are fully retracted over the uprights 352. In contrast, as illustrated in FIGS. 22 and 23, when in the part locking position, the latching bars 374 are raised and fully extended from the uprights 352. As should be appreciated, each latching bar 374 includes a stepped configuration so that each latching bar will receive and capture the end of each retaining arm 360, 362, 364, 366 when in the locking position. See particularly FIG. 23 with parts P removed for clarity. A clevis pin 376 is provided to secure each latching bar 374 in the locking position. The clevis pin 376 is captured in the boss 87 welded to a side of each latching bar 374. See also FIG. 24. More specifically, the captive pin 376 is inserted through a cooperating aperture in the upright 352 supporting the latching bar. As should be appreciated, the end 378 of the captive pin extends completely through the latching bar 374. A security tab 380 extends through an aperture 382 in the end 378 of the clevis pin 376 and is secured in position (i.e. connected into a closed loop). In one possible embodiment the security tabs 380 are frangible and must be broken in order to be pulled from the clevis pin 376 to allow the clevis pin to be released for displacement of the latching bars 374 and the retaining arms 366, 364, 362, 360 for the removal of parts P from the rack 300. In one possible embodiment the security tab 380 is a permanently locking, sacrificial zip tie.

As should be appreciated, the retaining grooves 356, 368 and the tabs 358 provide a defined location 314 for each part P. The overlying retaining arms 360, 362, 364, 366 ensure that each part P is maintained in those defined locations 314 where no one part touches another part.

During chemical pretreatment, the rack 300 is dipped into a tank containing a chemical solution. Air is often trapped in individual parts P during dipping creating a buoyancy that tends to lift the parts P from the grooves 356, 368 and tabs 358. The overlying retaining arms 360, 362, 364, 366 function to maintain the parts P in the defined locations 314 within the grooves 356, 368 and on the tabs 358 so that the parts will receive the full benefit of the treatment.

An alternative method of racking such parts would be in a vertical orientation to aid drainage; however such a configuration requires deeper chemical tanks, a larger oven and a larger pretreatment system. Another alternative is to rotate the rack as it is dipped and raised i.e. horizontal within the tank to reduce tank size and chemical volume but pivoted to vertical on entry and exit to aid drainage. Such a line is more complex, costly and slower in operation. Horizontal with a trapped air pocket is also advantageous as the inner surface does not require pretreatment, thereby saving chemical consumption and minimizing "drag-out".

Figure 25:
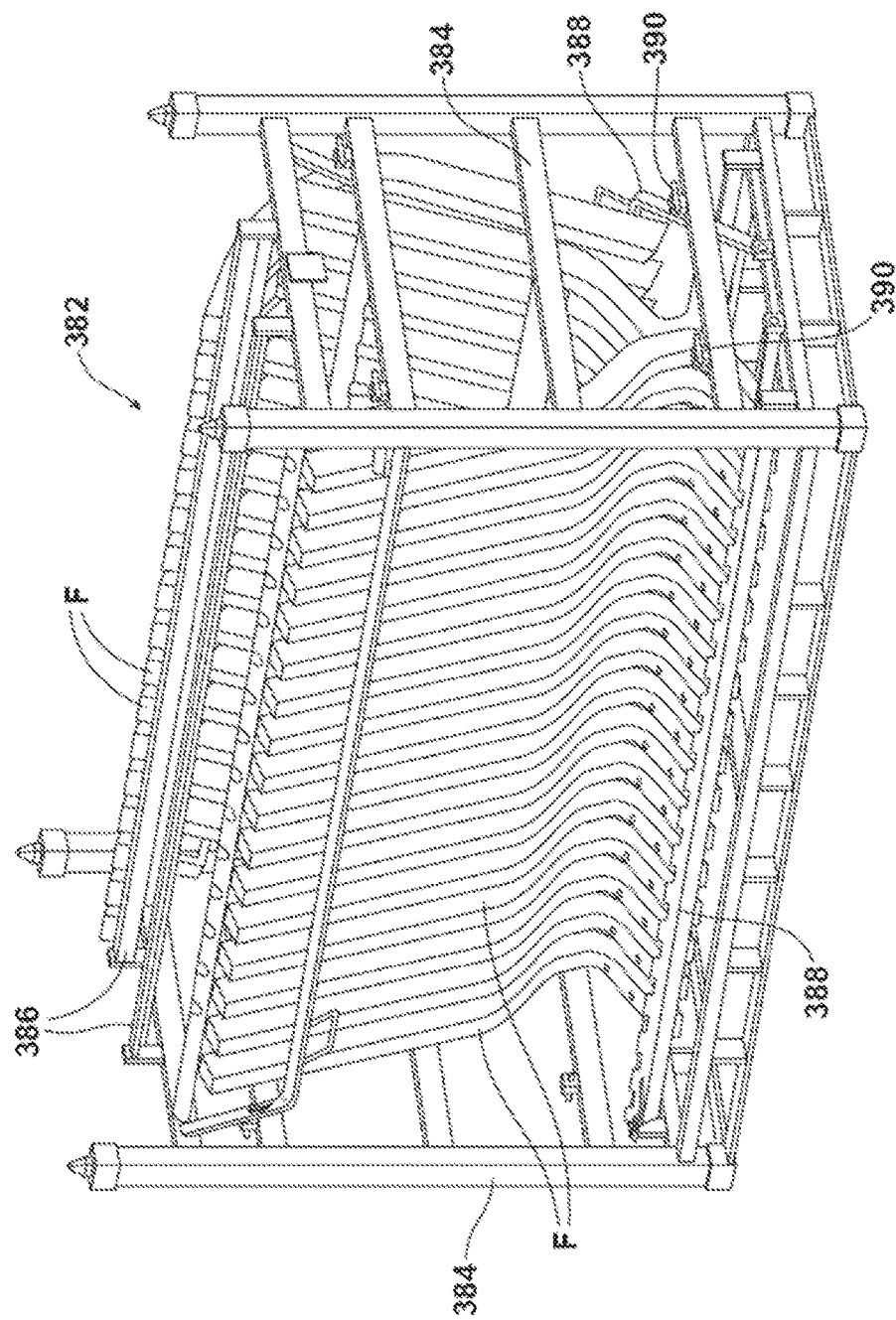
FIG. 25 is a perspective view illustrating an alternative rack embodiment loaded with a group of parts in the form of front rails.
Figure 26:
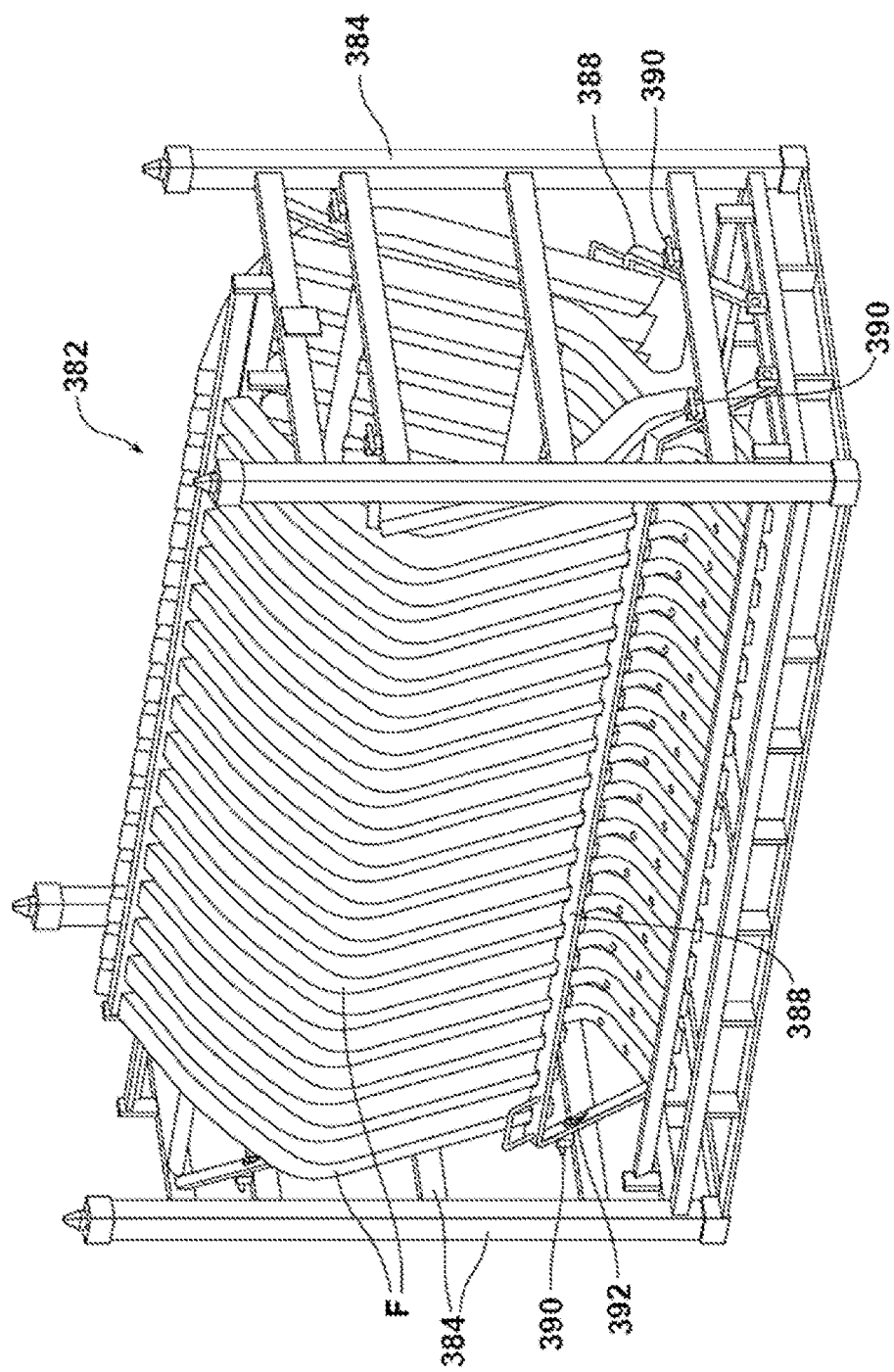
FIG. 26 illustrates the latching bar of the alternative embodiment including the clevis pin and the security tab.
Figure 27:
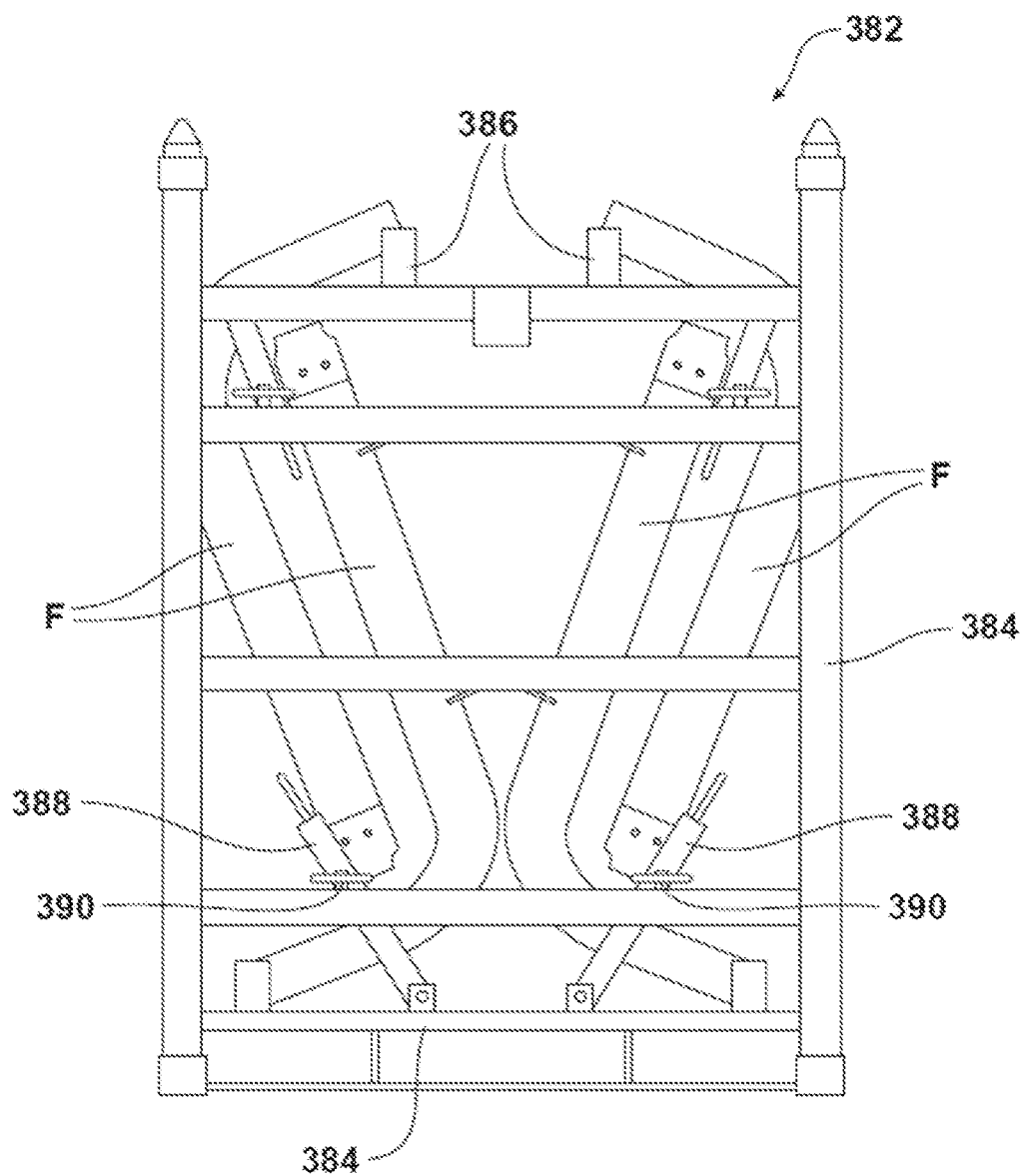
FIG. 27 is an end view of the fully loaded alternative embodiment of the rack illustrated in FIGS. 25 and 26.

Reference is now made to FIGS. 25-27 illustrating an alternative embodiment of rack 382 for holding a plurality of parts illustrated as front rails F in defined locations. As illustrated in FIG. 25, the rack 382 includes a frame 384 which holds a first series of front rails F on each side of a centerline defined between the two top rails 386. As illustrated in FIGS. 26 and 27, a second, outer layer of front rails F is then loaded on each side of the rack 384. Once loaded the latching bars 388 are displaced from the rack loading position illustrated in FIG. 25 to the part locking position illustrated in FIGS. 26 and 27. Clevis pins 390 and security tabs 392 function to lock the latching bar 388 in the part locking position in the same manner as the latching bars 374 of the first embodiment described above. The parts are positioned to maximize packing density but orientated to maximize draining efficiency. This front rail required the parts to be rotated to prevent horizontal "dead spots".

Figure 28:
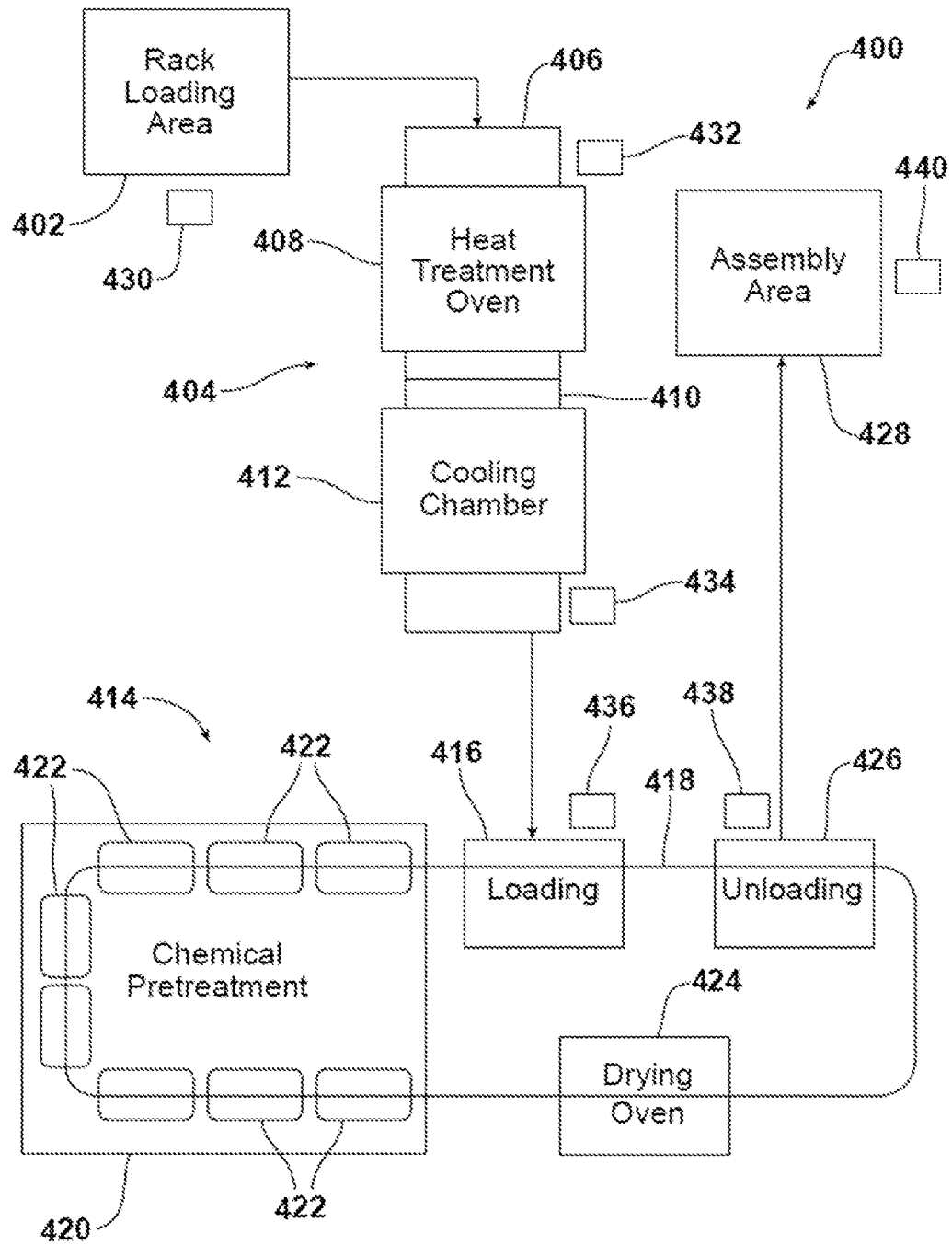
FIG. 28 is a schematical block diagram of a manufacturing plant floor.

Reference is now made to FIG. 28 which is a schematic block diagram of the floor 400 of the manufacturing plant. Block 402 in the drawing figure represents the rack loading area where the rack 400 is loaded with parts P in the manner described above. The loaded rack 300 is then delivered by forklift truck or other means from the rack loading area 402 to the heat treatment area generally designated by reference numeral 404. More specifically, the rack 300 is loaded onto a conveyor 406 which transports the rack 300 and the parts P locked therein through the heat treatment oven 408. Following heat treatment, that conveyor transfers the rack 300 and the parts P locked thereon to the conveyor 410. Conveyor 410 transports the rack 300 and parts P locked therein through the cooling chamber 412 thereby completing the heat treatment process.

A forklift or other means then transfers the rack 300 and the parts P locked therein to the chemical pretreatment area generally designated by reference numeral 414. More specifically, the fork lift truck delivers the rack 300 and the parts P locked therein to the loading area 416 where the racks are loaded onto a conveyor which, in the illustrated embodiment takes the form of a monorail 418. The racks 300 and the parts P locked therein are then transferred or transported by the monorail 118 through the chemical pretreatment facility 420. There the rack 300 and the parts P locked therein are dipped into the various treatment tanks 422 in order to complete the chemical pretreatment of the parts. The monorail 418 then delivers the racks 300 and the parts P held therein to the drying oven where the parts P and the rack 300 are dried before being delivered to the unloading station 426. A forklift truck or other means is then used to transfer or transport the racks 300 and the parts P locked therein to the assembly area 428 where the parts are removed from the rack and readied for vehicle assembly.

As should be appreciated, the parts P are locked into the rack 300 by means of the retaining arms 360, 362, 364, 366 and the latching assembly 316 including the latching bars 374 and clevis pin 376 at the rack loading area. The integrity of the processing of the parts P in the rack 300 through the heat treatment and chemical pretreatment process is ensured by the security tabs 380. More specifically, these security tabs 380 are inserted in the ends 378 of the clevis pins 376 and locked at the rack loading area 402 (before heat treatment). When the rack 300 reaches the assembly area 428, whole unbroken security tabs 380 indicate that all parts P in the rack 300 were properly subjected to heat treatment and chemical pretreatment. In contrast, if one of the frangible security tabs 380 is broken, that indicates the possibility that one or more parts P in the rack 300 did not undergo proper heat treatment or chemical pretreatment and, accordingly, the parts in that rack may be set aside for verification of proper heat treatment and chemical pretreatment processing where required. Thereby the security tab 380 ensures the integrity of the processing of the parts P. It should be noted that not all parts require the heat treatment step. For example, the roof rails that require high strength are heat treated post forming in order to artificially age the alloy and increase yield strength. Front rails are required to have lower yield and greater ductility and for this reason, front rails are not heat treated and are therefore taken from the rack loading area 402, by fork truck, to the pretreated loading area 416. Such a configuration allows different alloys with differing heat treatment requirements to be processed through the same line.

In one particularly useful embodiment, each rack 300 includes a plate 315 bearing a unique ID code to identify the particular rack 300 (see FIGS. 16 and 27). This could be a bar code or other scannable image if desired. Further, monitors 430, 432, 434, 436, 438, 440 are provided at various locations on the floor 400 of the plant. Each monitor 430, 432, 434, 436, 438, 440 may include a video camera and/or a scanner. As illustrated in FIG. 28, one monitor 1330 is provided at the rack loading area 402. Each part P loaded in the rack 300 may also have a specific, scannable ID number. Accordingly, the monitor 430 allows the recording of each individual part P loaded into a particular rack 300. The monitor 432 at the entrance to the heat treatment oven 408 records the time the particular rack enters the heat treatment oven 408. Monitor 434 at the exit to the cooling chamber 412 records the time when each particular rack 300 exits the cooling chamber 412. Monitor 436 records the time at which each particular rack 300 reaches the loading area 416 of the chemical pretreatment facility 414 while monitor 438 records the time when each particular rack is unloaded from the chemical pretreatment facility monorail 418. Finally, monitor 440 records the time when each rack 300 reaches the assembly area 428 and is unloaded. As each rack 300 has its own unique ID code and each part P held in each rack 300 is identified by its own ID number, the integrity of the heat treatment and chemical pretreatment processes may be monitored right down to the time the parts spend moving from the rack loading area 402 to the assembly area 428 including the specific time spent during heat treatment and chemical pretreatment. Of course, the heat treatment and chemical pretreatment processes are also monitored to ensure they are properly completed for each rack 300 of parts P. Such a process monitoring system on the floor of a manufacturing plant is disclosed in copending U.S. patent application Ser. No. 13/768,326, filed on Feb. 15, 2013 and entitled "Process Control For Post-Form Heat Treating Parts For An Assembly Operation", the full disclosure of which is incorporated herein by reference.

The foregoing has been presented for purposes of illustration and description. It is not intended to be exhaustive or to limit the embodiments to the precise form disclosed. Obvious modifications and variations are possible in light of the above teachings. For example, artificial aging or tempering and the institution of a flat nose part geometry are not required for all applications. All such modifications and variations are within the scope of the appended claims when interpreted in accordance with the breadth to which they are fairly, legally and equitably entitled.

What is claimed:

1. A method of forming a vehicle rail from aluminum, comprising:
   extruding an aluminum tube;
   longitudinally bending said aluminum tube to include a bend with an inner radius;
   preforming said aluminum tube after longitudinally bending;
   completing induction annealing of said aluminum tube; and
   hydroforming said aluminum tube into said vehicle rail, wherein the hydroforming includes providing the inner radius of the bend with a cross-sectional length of line reduction that is less than 1%.

2. The method of claim 1, including completing said bending in a rotary draw bending tool and completing said preforming in a forming die.

3. The method of claim 1, including completing said bending in a push-roll bending tool and completing said preforming in a forming die.

4. The method of claim 1, including completing said induction annealing following bending and before preforming.

5. The method of claim 1, including completing said induction annealing following preforming.

6. The method of claim 1, including completing said induction annealing after bending and after preforming.

7. The method of claim 1, including positioning the bent and preformed extruded aluminum tube into a hydroforming die, partially closing said hydro-forming die and subjecting said bent and performed extruded aluminum tube in said hydroforming die to a liquid under a first level of pressure.

8. The method of claim 7, including engaging the inner radius of the bend in said bent and preformed extruded aluminum tube with said hydroforming die before completely closing said hydroforming die thereby reducing the amount of outer fiber strain on said inner radius of said bend.

9. The method of claim 8, including forming a cross-section of non-constant radius including a first transition segment, a second transition segment and an intermediate segment between said first and second transition segments and providing said first and second transition segments with a tighter radius of curvature than said intermediate segment.

10. The method of claim 9, including completely closing said hydroforming die around said extruded aluminum tube and increasing level of liquid pressure to a second level to form and hydro-pierce a part from said bent and preformed extruded aluminum tube.

11. The method of claim 10, including maintaining a gap between said hydroforming die and said first and second transition segments during hydroforming.

12. The method of claim 11, including trimming said part to a desired length.

13. The method of claim 12, including loading a plurality of said parts onto a rack and heat treating a plurality of said parts together to artificially age said parts and provide desired strength characteristics.

14. The method of claim 13, including chemically pretreating a plurality of said parts together on said rack to provide a chemical pretreatment to said parts after heat treating.

15. The method of claim 12, including loading a plurality of said parts onto a rack and chemically pretreating a plurality of said parts together to provide a chemical pretreatment to said parts after trimming.

16. The method of claim 15, including heat treating a plurality of said parts together on said rack to artificially age said parts and provide desired strength characteristics after chemical pretreatment.

17. The method of claim 1, including extruding said aluminum tube into a round cross-section from 6xxx aluminum alloy material.

* * * * *